(12) United States Patent
Denton et al.

(10) Patent No.: US 9,567,219 B2
(45) Date of Patent: Feb. 14, 2017

(54) METHOD AND SYSTEMS FOR FORMING CARBON NANOTUBES

(71) Applicants: ExxonMobil Upstream Research Company, Houston, TX (US); Solid Carbon Products LLC, Provo, UT (US)

(72) Inventors: Robert D. Denton, Houston, TX (US); Dallas B. Noyes, Provo, UT (US)

( * ) Notice: Subject to any disclaimer, the term of this patent is extended or adjusted under 35 U.S.C. 154(b) by 0 days.

(21) Appl. No.: 14/364,579

(22) PCT Filed: Dec. 12, 2012

(86) PCT No.: PCT/US2012/069276
§ 371 (c)(1),
(2) Date: Jun. 11, 2014

(87) PCT Pub. No.: WO2013/090444
PCT Pub. Date: Jun. 20, 2013

(65) Prior Publication Data
US 2014/0348739 A1    Nov. 27, 2014

Related U.S. Application Data

(60) Provisional application No. 61/582,098, filed on Dec. 30, 2011, provisional application No. 61/569,494, filed on Dec. 12, 2011.

(51) Int. Cl.
*C01B 31/02* (2006.01)
*D01F 9/127* (2006.01)
*B82Y 30/00* (2011.01)

(52) U.S. Cl.
CPC ............ *C01B 31/0226* (2013.01); *B82Y 30/00* (2013.01); *D01F 9/127* (2013.01); *D01F 9/1272* (2013.01);
(Continued)

(58) Field of Classification Search
CPC ...... D01F 9/127; D01F 9/1272; D01F 9/1278; C01B 31/0226; B82Y 30/00; Y02P 70/623
(Continued)

(56) References Cited

U.S. PATENT DOCUMENTS 4,048,352 A  *  9/1977  Pignocco ............. C21C 5/4613
                                                       138/109
6,333,016 B1    12/2001  Resasco et al.
(Continued)

FOREIGN PATENT DOCUMENTS

CN        1495127 A      5/2004
CN     101707864 A      5/2010
(Continued)

OTHER PUBLICATIONS

Holmes, et al., A Carbon Dioxide Reduction Unit Using Bosch Reaction and Expendable Catalyst Cartridges, National Aeronautics and Space Administration, NASA CR-1682, Nov. 1970.*
(Continued)

*Primary Examiner* — Daniel C McCracken
(74) *Attorney, Agent, or Firm* — International IP Law Group, P.L.L.C.

(57) ABSTRACT

Systems and a method for forming carbon nanotubes are described. A method includes forming carbon nanotubes in a reactor, using a Bosch reaction. The carbon nanotubes are separated from a reactor effluent to form a waste gas stream. The feed gas, a dry waste gas stream, or both, are heated with waste heat from the waste gas stream. The waste gas stream is chilled in an ambient temperature heat exchanger to condense water vapor, forming a dry waste gas stream.

27 Claims, 18 Drawing Sheets

(52) U.S. Cl.
CPC ............ *D01F 9/1278* (2013.01); *Y02P 20/129* (2015.11); *Y02P 70/623* (2015.11)

(58) Field of Classification Search
USPC .................................... 423/447.3; 422/245.1
See application file for complete search history.

(56) References Cited

U.S. PATENT DOCUMENTS

| | | |
|---|---|---|
| 7,311,889 B2 | 12/2007 | Awano et al. |
| 7,646,588 B2 | 1/2010 | Miyahara et al. |
| 2007/0253889 A1 | 11/2007 | Awano et al. |
| 2008/0049380 A1 | 2/2008 | Miyahara et al. |
| 2009/0074463 A1 | 3/2009 | Nishio et al. |

FOREIGN PATENT DOCUMENTS

| | | |
|---|---|---|
| DE | 102009059310 A1 | 6/2011 |
| TW | 200923121 A | 6/2009 |
| TW | M365928 | 10/2009 |
| WO | WO2010120581 A1 | 10/2010 |

OTHER PUBLICATIONS

Perry's Chemical Engineer's Handbook, Fifth Edition, 1973, pp. 11-1 to 11-54.*
Australian Patent Examination Report No. 1, dated Apr. 22, 2015.
Chinese Office Action, dated Jun. 24, 2015.
Intellectual Property Office of Singapore Written Opinion, dated Mar. 27, 2015.
Supplementary European Search Report, dated Jul. 7, 2015.
PCT International Search Report, dated Mar. 8, 2013, for PCT Application PCT/US12/69276, Filed Dec. 12, 2012.
Taiwan IPO Search Report, TW 101150517, Oct. 17, 2016, 2 pps.

\* cited by examiner

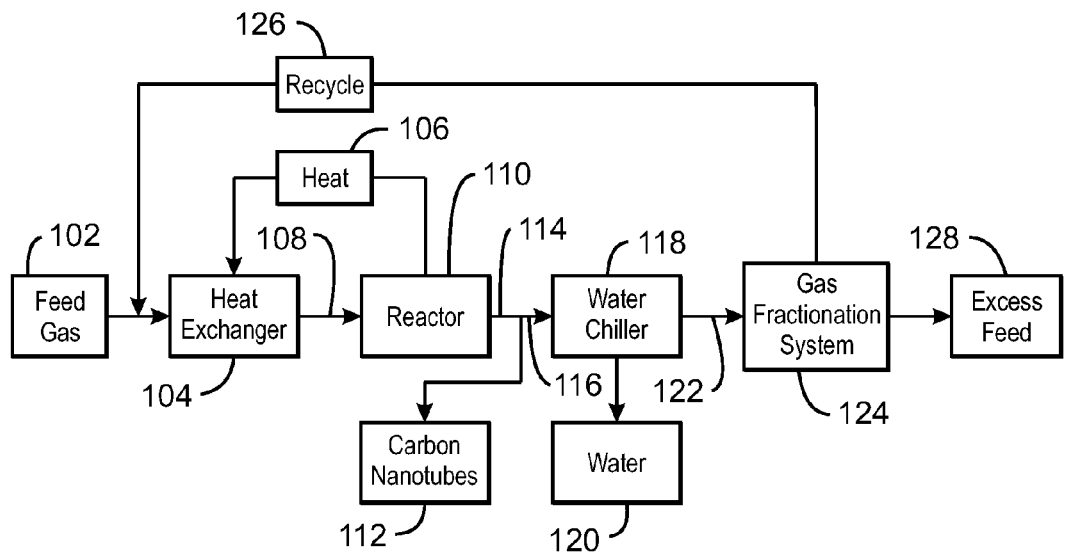
100
FIG. 1
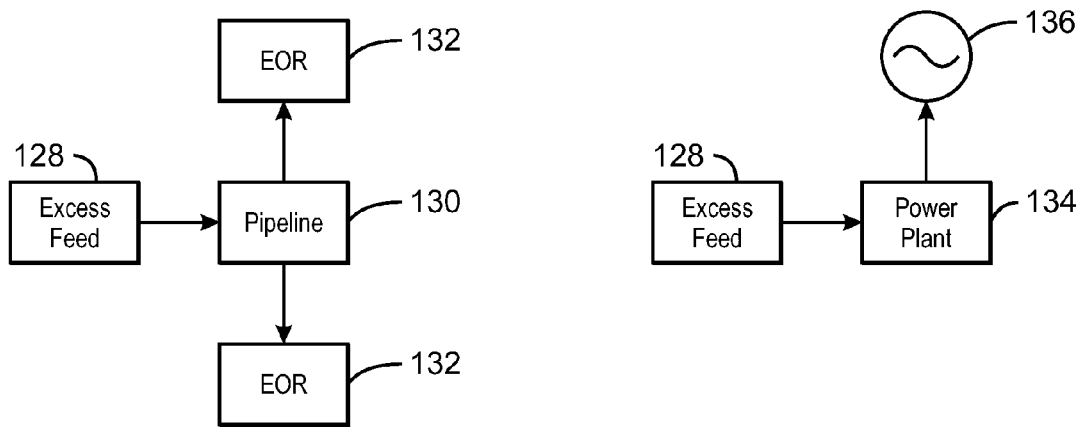
FIG. 1A
FIG. 1B

200

600

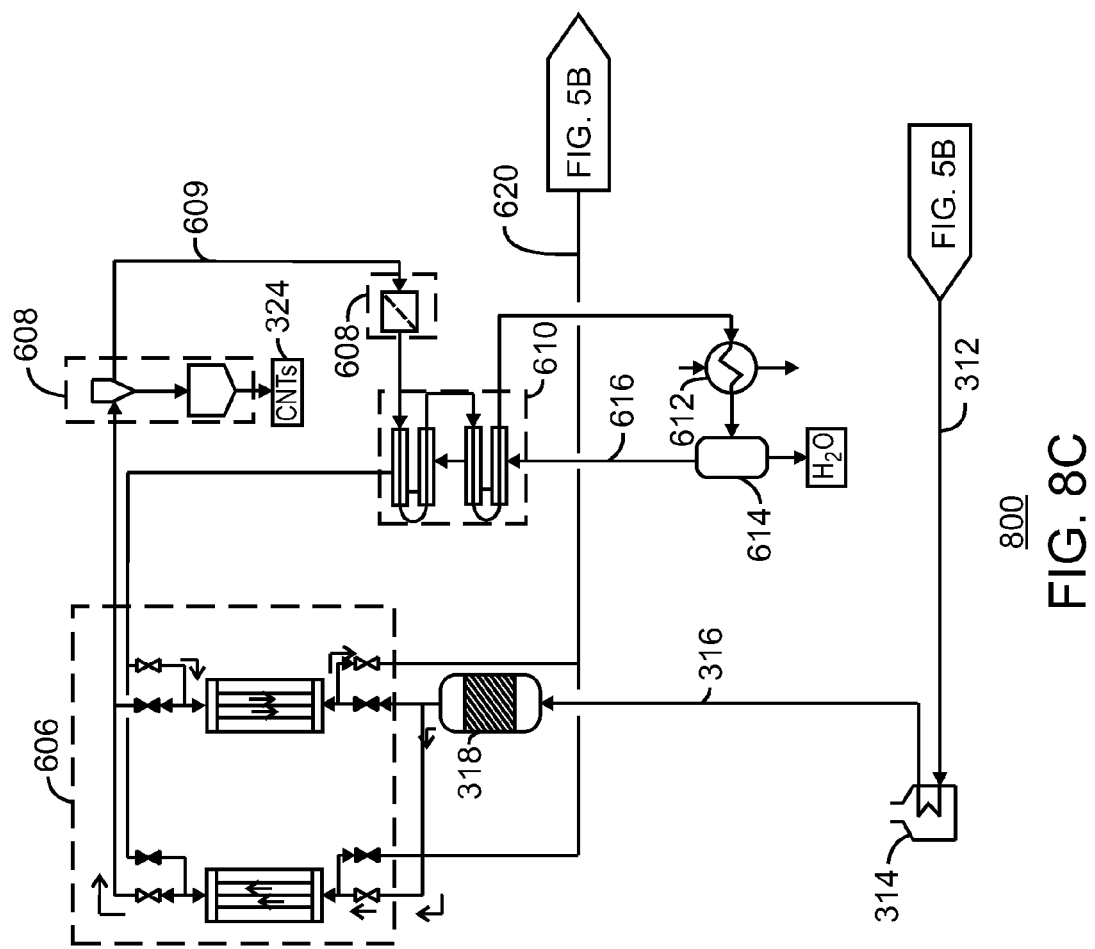

1100

1200

METHOD AND SYSTEMS FOR FORMING CARBON NANOTUBES

RELATED APPLICATIONS

This application claims priority to U.S. Provisional Patent Application Ser. No. 61/569,494 by Denton and Noyes and titled "Methods and System for Forming Carbon Nanotubes," which was filed 12 Dec. 2011, and to U.S. Provisional Patent Application Ser. No. 61/582,098 by Denton and Noyes and titled "Method and Systems for Forming Carbon Nanotubes," which was filed 30 Dec. 2011.

FIELD

The present techniques relate to an industrial scale process for forming carbon fibers and carbon nanomaterials.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Materials formed predominately of solid or elemental carbon have been used in numerous products for many years. For example, carbon black is a high carbon content material used as a pigment and reinforcing compound in rubber and plastic products, such as car tires. Carbon black is usually formed by the incomplete thermal pyrolysis of hydrocarbons, such as methane or heavy aromatic oils. Thermal blacks, formed by the pyrolysis of natural gas, include large unagglomerated particles, for example, in the range of 200-500 nm in size, among others. Furnace blacks, formed by the pyrolysis of heavy oils, include much smaller particles, in the range of 10-100 nm in size, that agglomerate or stick together to form structures. In both cases, the particles may be formed from layers of graphene sheets that have open ends or edges. Chemically, the open edges form reactive areas that can be used for absorption, bonding into matrices, and the like.

More recent forms of elemental carbon, such as fullerenes, have been developed, and are starting to be developed in commercial applications. In contrast to the more open structures of carbon black, fullerenes are formed from carbon in a closed graphene structure, i.e., in which the edges are bonded to other edges to form spheres, tubes, and the like. Two structures, carbon nanofibers and carbon nanotubes, have numerous potential applications, ranging from batteries and electronics to the use in concrete in the construction industry. Carbon nanomaterials may have a single wall of graphene or multiple nested walls of graphene or form a fiber structure from a stacked set of sheets in a cup or plate form. The ends of the carbon nanotubes are often capped with hemispherical structures, in a fullerene-like configuration. Unlike for carbon black, large scale production processes have not been implemented for carbon nanomaterials. However, research has been conducted on a number of proposed production processes.

Arc-based, laser-based ablation techniques and chemical vapor deposition have classically been used to generate carbon nanotubes from a carbon surface. For example, techniques for generating carbon nanotubes are reviewed in Karthikeyan, et al., "Large Scale Synthesis of Carbon Nanotubes," E-Journal of Chemistry, 2009, 6(1), 1-12. In one technique described, an electric arc is used to vaporize graphite from electrodes in the presence of metal catalysts, achieving production rates of about 1 gram/min. Another technique described uses laser ablation to vaporize carbon from a target electrode in an inert gas stream. However, the laser technique uses high purity graphite and high power lasers, but provides a low yield of carbon nanotubes, making it impractical for large scale synthesis. A third technique described by the authors, is based on chemical vapor deposition (CVD), in which a hydrocarbon is thermally decomposed in the presence of a catalyst. In some studies, these techniques have achieved production rates of up to a few kilograms/hour at a 70% purity level. However, none of the processes described are practical for large scale commercial production.

Hydrocarbon pyrolysis is used in the production of carbon black and various carbon nanotube and fullerene products. Various methods exist for creating and harvesting various forms of solid carbon through the pyrolysis of hydrocarbons using temperature, pressure, and the presence of a catalyst to govern the resulting solid carbon morphology. For example, Kauffman, et al., (U.S. Pat. No. 2,796,331) discloses a process for making fibrous carbon of various forms from hydrocarbons in the presence of surplus hydrogen using hydrogen sulfide as a catalyst, and methods for collecting the fibrous carbon on solid surfaces. Kauffman also claims the use of coke oven gas as the hydrocarbon source.

In another study, a flame based technique is described in Vander Wal, R. L., et al., "Flame Synthesis of Single-Walled Carbon Nanotubes and Nanofibers," Seventh International Workshop on Microgravity Combustion and Chemically Reacting Systems, August 2003, 73-76 (NASA Research Publication: NASA/CP-2003-212376/REV1). The technique used the introduction of a CO or $CO/C_2H_2$ mixture into a flame along with a catalyst to form the carbon nanotubes. The authors noted the high productivity that could be achieved using flame based techniques for the production of carbon black. However, the authors noted that scaling the flame synthesis presented numerous challenges. Specifically, the total time for catalyst particle formation, inception of the carbon nanotubes, and growth of the carbon nanotubes was limited to about 100 ms.

International Patent Application Publication WO/2010/120581, by Noyes, discloses a method for the production of various morphologies of solid carbon product by reducing carbon oxides with a reducing agent in the presence of a catalyst. The carbon oxides are typically either carbon monoxide or carbon dioxide. The reducing agent is typically either a hydrocarbon gas or hydrogen. The desired morphology of the solid carbon product may be controlled by the specific catalysts, reaction conditions and optional additives used in the reduction reaction. The process is conducted at a low pressure and uses a cryogenic chilling process to remove water from a feed stream.

While all of the techniques described can be used to form carbon nanotubes, none of the processes provide a practical method for bulk or industrial scale production. Specifically, the amounts formed and the process efficiencies are both low.

SUMMARY

An embodiment described herein provides a system for the production of carbon nanotubes. The system includes a feed gas heater configured to heat a feed gas with waste heat from a waste gas stream, a reactor configured to form carbon nanotubes from the feed gas in a Bosch reaction, a separator configured to separate the carbon nanotubes from the reactor effluent stream forming the waste gas stream, and a water removal system. The water removal system includes an ambient temperature heat exchanger and separator configured to separate the bulk of the water from the waste gas stream to form a dry waste gas stream.

Another embodiment provides a method for forming carbon nanotubes. The method includes forming carbon nanotubes in a reactor using a Bosch reaction, separating the carbon nanotubes from a reactor effluent to form a waste gas stream, and heating the feed gas, a dry waste gas stream, or both, with waste heat from the waste gas stream. The waste gas stream is chilled in an ambient temperature heat exchanger to condense water vapor, forming the dry waste gas stream.

Another embodiment provides a reaction system for forming carbon nanotubes. The reaction system includes two or more reactors configured to form carbon nanotubes from gas streams using a Bosch reaction, wherein an effluent from each reactor, before a final reactor, is used as a feed stream for a downstream reactor. An effluent stream from the final reactor includes a reactant depleted waste stream. A separation system is disposed downstream of each reactor, wherein the separation system is configured to remove carbon nanotubes from the effluent from the reactor. A feed heater is disposed downstream of each separation system, wherein the feed heater includes a heat exchanger configured to heat a feed gas stream for a following reactor using waste heat from the effluent from the reactor, and wherein the feed heater downstream of the final reactor is configured to heat a gas stream for the first reactor. An ambient temperature heat exchanger is located downstream of each feed heater, wherein the ambient temperature heat exchanger is configured to remove water from the effluent, forming the feed stream for the following reactor. A compressor is configured to increase the pressure of the reactant depleted waste stream. An ambient temperature heat exchanger located downstream of the compressor is configured to remove water from the reactant depleted waste stream. A gas fractionation system is configured to separate the reactant depleted waste stream into a methane enriched stream and a carbon dioxide enriched stream, and a mixer is configured to blend the methane enriched stream or the carbon dioxide enriched stream into an initial feed stream.

DESCRIPTION OF THE DRAWINGS

The advantages of the present techniques are better understood by referring to the following detailed description and the attached drawings, in which:

FIG. 1 is a block diagram of a reaction system that generates carbon nanotubes, for example, as a by-product of a carbon dioxide sequestration reaction;

FIG. 1A is a block diagram of the use of an excess carbon dioxide feed in an enhanced oil recovery (EOR) process;

FIG. 1B is a block diagram of the use of an excess methane feed in a power generation process;

FIGS. 8A, 8B, and 8C are simplified process flow diagrams of a two reactor system for making carbon nanotubes from a gas feed that includes carbon dioxide and methane, in which the methane is in excess;

DETAILED DESCRIPTION

Figure 2:
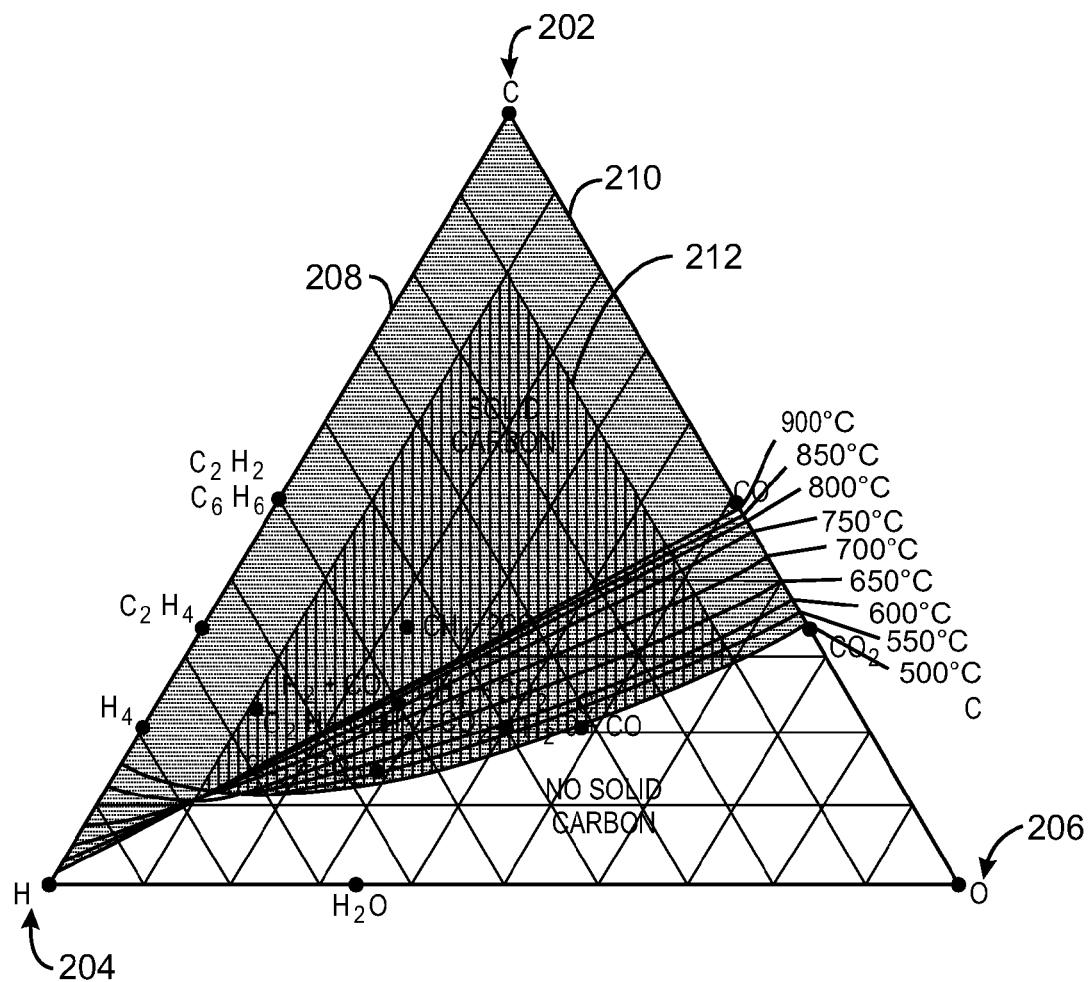
FIG. 2 is a C—H—O equilibrium diagram of the equilibria between carbon, hydrogen, and oxygen, indicating species in equilibrium at various temperature conditions.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

Carbon fibers, nanofibers, and nanotubes are allotropes of carbon that have a cylindrical structure, which can be in the nanometer range. Carbon nanofibers and nanotubes are members of the fullerene structural family, which includes the spherical carbon balls termed "buckminister fullerene." The walls of the carbon nanotubes are formed from sheets of carbon in a graphene structure. As used herein, nanotubes may include single wall nanotubes and multiple wall nanotubes of any length. It can be understood that the term "carbon nanotubes" as used herein and in the claims, includes other allotropes of carbon, such as carbon fibers, carbon nanofibers, and other carbon nanostructures.

A "compressor" is a device for compressing a working gas, including gas-vapor mixtures or exhaust gases, and includes pumps, compressor turbines, reciprocating compressors, piston compressors, rotary vane or screw compressors, and devices and combinations capable of compressing a working gas. In some embodiments, a particular type of compressor, such as a compressor turbine, may be preferred. A piston compressor may be used herein to include a screw compressor, rotary vane compressor, and the like.

As used herein, a "plant" is an ensemble of physical equipment in which chemical or energy products are processed or transported. In its broadest sense, the term plant is applied to any equipment that may be used to produce energy or form a chemical product. Examples of facilities include polymerization plants, carbon black plants, natural gas plants, and power plants.

A "hydrocarbon" is an organic compound that primarily includes the elements hydrogen and carbon, although nitrogen, sulfur, oxygen, metals, or any number of other elements may be present in small amounts. As used herein, hydrocarbons generally refer to components found in natural gas, oil, or chemical processing facilities.

As used herein, the term "natural gas" refers to a multi-component gas obtained from a crude oil well or from a subterranean gas-bearing formation. The composition and pressure of natural gas can vary significantly. A typical natural gas stream contains methane ($CH_4$) as a major component, i.e., greater than 50 mol % of the natural gas stream is methane. The natural gas stream can also contain ethane ($C_2H_6$), higher molecular weight hydrocarbons (e.g., $C_3$-$C_{20}$ hydrocarbons), one or more acid gases (e.g., hydrogen sulfide), or any combination thereof. The natural gas can also contain minor amounts of contaminants such as water, nitrogen, iron sulfide, wax, crude oil, or any combination thereof. The natural gas stream may be substantially purified prior to use in embodiments, so as to remove compounds that may act as poisons.

A "low-BTU natural gas" is a gas that includes a substantial proportion of $CO_2$ as harvested from a reservoir. For example, a low BTU natural gas may include 10 mol % or higher $CO_2$ in addition to hydrocarbons and other components. In some cases, the low BTU natural gas may include mostly $CO_2$.

Overview

Embodiments described herein provide systems and methods for making carbon fibers, nanofibers, and nanotubes (CNTs) on an industrial scale using feedstocks that can include nearly stoichiometric mixtures of carbon dioxide and methane, among others. In some embodiments, the feedstocks are higher in $CH_4$, while in other embodiments, the feedstocks are higher in $CO_2$. Other feedstocks may be used, including mixtures of $H_2$, CO, $CO_2$, and other hydrocarbons. The process is conducted under high temperature and pressure conditions using a Bosch reaction, as discussed with respect to FIG. 2.

The process may be slightly exothermic, energy neutral, or slightly endothermic. Accordingly, at least a portion of the heat from the reaction can be recovered and used to heat the feed gases, providing a portion of the heat used by the process during continuous operations. As a high pressure process is used, an ambient temperature heat exchanger is sufficient for the removal of water vapor from the product stream, without using cryogenic coolers. After separation of the product and water formed during the reaction, a gas fractionation system is used to separate any remaining amounts of the limiting reagent from a waste gas mixture and recycle this reagent to the process.

As used herein, an ambient temperature heat exchanger can include water chillers, air coolers, or any other cooling system that exchanges heat with a source that is at substantially ambient temperature. It can be understood that ambient temperature is substantially the temperature of the outside air at the location of the facility, e.g., ranging from about −40° C. to about +40° C., depending on the location of the facility. Further, different types of ambient temperature heat exchangers may be used depending on current ambient temperature. For example, a facility that uses water chillers in a summer season may use air coolers in a winter season. It can be understood that an appropriate type of heat exchanger may be used at any point herein that describes the use of an ambient temperature heat exchanger. The ambient temperature heat exchangers may vary in type across the plant depending on the amount of cooling needed.

Embodiments described herein can be used to produce industrial quantities of carbon products such as fullerenes, carbon nanotubes, carbon nanofibers, carbon fibers, graphite, carbon black, and graphene, among others, using carbon oxides as the primary carbon source. The balance of the possible products may be adjusted by the conditions used for the reaction, including catalyst compositions, temperatures, pressures, feedstocks, and the like. In a reactor system, the carbon oxides are catalytically converted to solid carbon and water. The carbon oxides may be obtained from numerous sources, including the atmosphere, combustion gases, process off-gases, well gas, and other natural and industrial sources.

The present process uses two feedstocks, a carbon oxide, e.g., carbon dioxide ($CO_2$) or carbon monoxide (CO), and a reducing agent, e.g., methane ($CH_4$) or other hydrocarbons, hydrogen ($H_2$), or combinations thereof. The reducing agent may include other hydrocarbon gases, hydrogen ($H_2$), or mixtures thereof. A hydrocarbon gas can act as both an additional carbon source and as the reducing agent for the carbon oxides. Other gases, such as syngas, may be created as intermediate compounds in the process or may be contained in the feed. These gases can also be used as the reducing agent. Syngas, or "synthetic gas," includes carbon monoxide (CO) and hydrogen ($H_2$) and, thus, includes both the carbon oxide and the reducing gas in a single mixture. Syngas may be used as all or a portion of the feed gas.

Carbon oxides, particularly carbon dioxide, are abundant gases that may be extracted from exhaust gases, low-BTU well gas, and from some process off-gases. Although carbon dioxide may also be extracted from the air, other sources often have much higher concentrations and are more economical sources from which to harvest the carbon dioxide. Further, carbon dioxide is available as a by-product of power generation. The use of $CO_2$ from these sources may lower the emission of carbon dioxide by converting a portion of the $CO_2$ into carbon products.

The systems described herein may be incorporated into power production and industrial processes for the sequestration of carbon oxides, allowing their conversion to solid carbon products. For example, the carbon oxides in the combustion or process off-gases may be separated and concentrated to become a feedstock for this process. In some cases these methods may be incorporated directly into the process flow without separation and concentration, for example as an intermediate step in a multi-stage gas turbine power station.

FIG. 1 is a block diagram of a reaction system 100 that generates carbon structures, for example, as a by-product of a carbon dioxide sequestration reaction. The reaction system 100 is provided a feed gas 102, which can be a mixture of $CO_2$ and $CH_4$. In some embodiments, the reaction may allow for sequestration of $CO_2$ from exhaust streams of power plants and the like. In other embodiments, the $CH_4$ is at a higher concentration, for example, in a gas stream from a natural gas field. Other components may be present in the feed gas 102, such as $C_2H_6$, $C_2H_4$, and the like. In one embodiment, the feed gas 102 has been treated to remove these components, for example, for sale as product streams.

The feed gas 102 is passed through a heat exchanger 104 to be heated for reaction. During continuous operation, a portion of the heating is provided using heat 106 recovered from the reaction. The remaining heat for the reaction may be provided by an auxiliary heater, as described below. During start-up, the auxiliary heater is used to provide the total heat to bring the feed to the appropriate reaction temperature, e.g., about 930-1832° F. (about 500-1000° C.). In one embodiment, the feed is heated to about 1650° F. (around 900° C.). The heated feed gas 108 is fed to a reactor 110.

In the reactor 110, a catalyst reacts with a portion of the heated feed gas 108 to form carbon nanotubes 112 using the Bosch reaction. As described in more detail below, the reactor 110 can be a fluidized bed reactor that uses any number of different catalysts, including, for example, metal shot, supported catalysts, and the like. The carbon nanotubes 112 are separated from the flow stream 114 out of the reactor 110, leaving a waste gas stream 116 containing excess reagents and water vapor. At least a portion of the heat from the flow stream 114 is used to form the heated feed gas 108 prior to the flow stream 114 entering the chiller as the waste gas stream 116.

The waste gas stream 116 is passed through an ambient temperature heat exchanger, such as water chiller 118, which condenses out the water 120. The resulting dry waste gas stream 122 is used as a feed stream for a gas fractionation system 124. It can be understood that a dry waste gas stream, as used herein, has the bulk of the water removed, but may still have small amounts of water vapor. For example, the dew point of a dry waste gas stream may be greater than about 10° C., greater than about 20° C., or higher. A dryer may be used to lower the dewpoint, for example, to −50° C. or lower, prior to gas fractionation.

The gas fractionation system 124 removes a portion of the reagent having the lower concentration in the feed gas 102 and recycles it to the process, for example, by blending a recycle stream 126 with the feed gas 102. The higher concentration gas in the feed gas 102 can be disposed of as excess feed 128, for example, by sales to downstream users. As an example, if $CO_2$ is the highest concentration gas in a blend with $CH_4$, the gas fractionation system 124 can be used to remove $CH_4$ remaining in the waste gas stream, and send it back into the process as recycle 126. The process functions as an equilibrium reaction between the reagents and solid carbon, as discussed further with respect to FIG. 2. The gas fractionation system 124 may not be needed when the $CH_4$ is in excess, as much of the $CO_2$ may be consumed in the reaction. Thus, the excess feed 128 that contains the $CH_4$, and which may also contain $H_2$, CO, and other gases, may be used to generate power in a power plant without further purification or gas separation, as discussed with respect to FIG. 1C.

FIG. 1A is a block diagram of the use of an excess carbon dioxide feed in an enhanced oil recovery (EOR) process. If the excess feed gas 102 (FIG. 1) is $CO_2$, the excess feed 128 may be sold to a distributor for marketing through a pipeline 130. Individual users may obtain the $CO_2$ from the pipeline 130 and use it in enhanced oil recovery processes 132. For example, the $CO_2$ can be used to pressurize hydrocarbon reservoirs to increase the recovery of hydrocarbons.

FIG. 1B is a block diagram of the use of an excess methane feed in a power generation process. If the excess feed gas 102 (FIG. 1) is $CH_4$, the excess feed 128 can be used in a power plant 134 to generate power, either on-site, or after transporting the excess feed 128 through a pipeline to the power plant 134. The electricity 136 generated in the power plant 134 can be used on-site to power the reaction system 100 or may be provided to a grid for use by other consumers. The excess feed 128 can contain a number of other gases as by-products of the CNT formation process, and, thus, the excess feed 128 may be purified prior to any commercial sales, such as to a pipeline company.

FIG. 2 is a C—H—O equilibrium diagram 200 of the equilibria between carbon 202, hydrogen 204, and oxygen 206, indicating species in equilibrium at various temperature conditions. There is a spectrum of reactions involving these three elements in which various equilibria have been named as reactions. The equilibrium lines at various temperatures that traverse the diagram show the approximate regions in which solid carbon will form. For each temperature, solid carbon will form in the regions above the associated equilibrium line, but will not form in the regions below the equilibrium line.

Hydrocarbon pyrolysis is an equilibrium reaction between hydrogen and carbon that favors solid carbon production, typically with little or no oxygen or water present, e.g., along the equilibrium line 208 from higher hydrogen 204 content to higher carbon 202 content. The Boudouard reaction, also called the carbon monoxide disproportionation reaction, is an equilibrium reaction between carbon and oxygen that favors solid carbon production, typically with little or no hydrogen or water present, and is along the equilibrium line 210, from higher oxygen 206 content to higher carbon 202 content.

The Bosch reaction is an equilibrium reaction that favors solid carbon production when carbon, oxygen, and hydrogen are present. In the C—H—O equilibrium diagram 200, the Bosch reactions are located in the interior region of the triangle, for example, in region 212, where equilibrium is established between solid carbon and reagents containing carbon, hydrogen, and oxygen in various combinations. Numerous points in the Bosch reaction region 212 favor the formation of CNTs and several other forms of solid carbon product. The reaction rates and products may be enhanced by the use of a catalyst, such as iron. The selection of the catalysts, reaction gases, and reaction conditions may provide for the control of the type of carbon formed. Thus, these methods open new routes to the production of solid carbon products such as CNTs.

Reaction Systems

Figure 3:
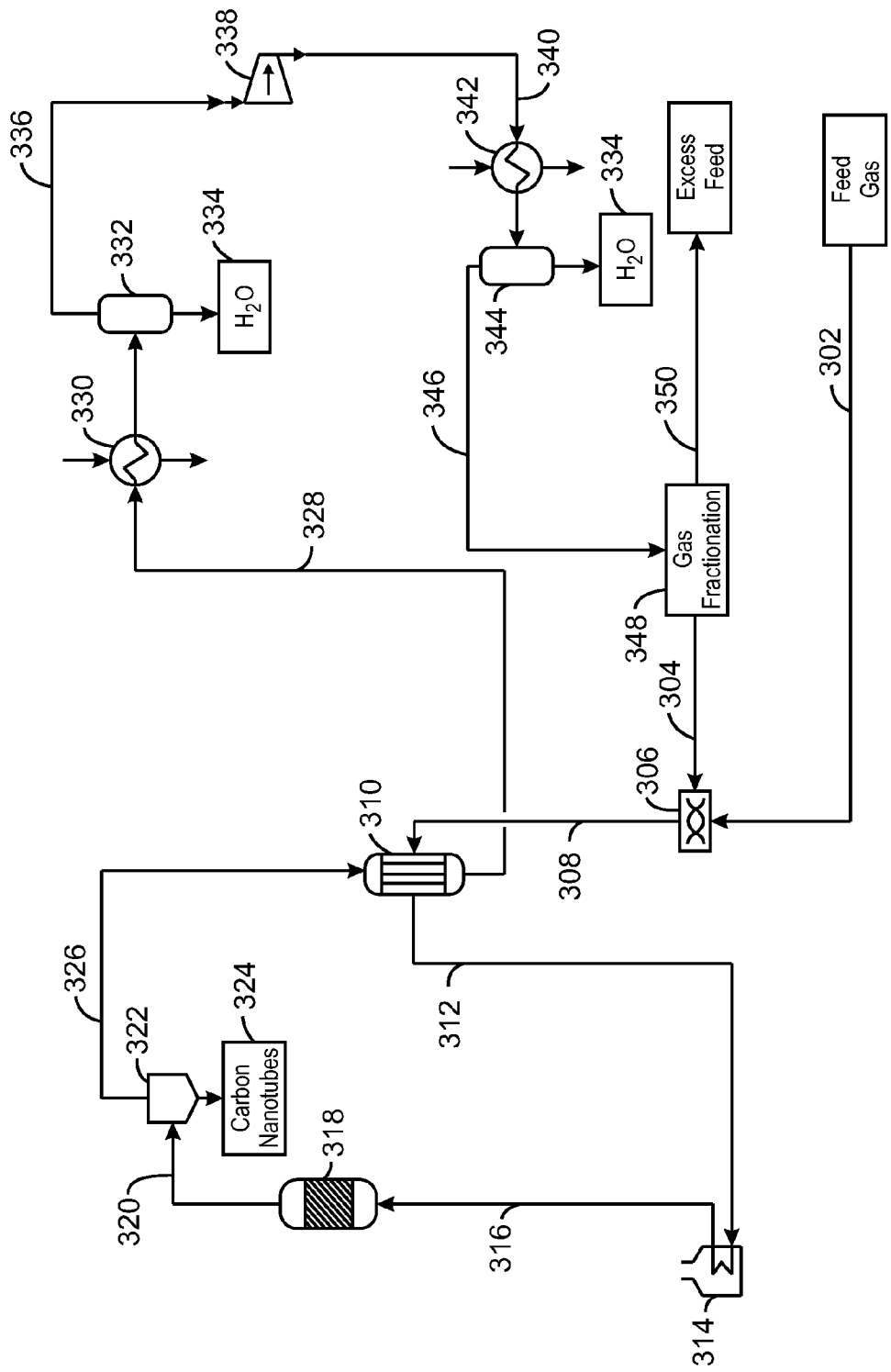
FIG. 3 is a simplified process flow diagram of a one reactor system for making carbon nanotubes from a gas feed that includes carbon dioxide and methane.

FIG. 3 is a simplified process flow diagram of a one reactor system 300 for making carbon nanotubes from a gas feed that includes carbon dioxide and methane. As shown, the one reactor system 300 can be used for feed gas 302 that is higher in $CO_2$ or higher in $CH_4$. More specific reactor systems are discussed with respect to FIGS. 5 and 6 for a higher $CO_2$ content feed gas and FIGS. 7 and 8 for a higher $CH_4$ content feed gas. In the reaction system 300, the feed gas 302 is combined with a recycle gas 304 that has an enhanced concentration of the lesser gas. This may be done using a static mixer 306.

The combined gas stream 308 is passed through a heat exchanger 310 or set of heat exchangers 310 in series to be heated by a reactor effluent stream. The temperature can be raised from about 90° F. (about 32.2° C.) to about 1400° F. (about 760° C.) for the heated gas stream 312. This temperature may be sufficient for maintaining the reaction during continuous operations. However, part of the heat may be provided by a package heater 314, which may be especially useful for adding heat to bring the reactants up to temperature during start-up. The hot gas stream 316 is then introduced into a fluidized bed reactor 318. A general fluidized bed reactor that may be used in embodiments is discussed with respect to FIG. 9. In the fluidized bed reactor 318, carbon nanotubes are formed on catalyst particles. The catalyst particles and reactions are further discussed with respect to FIG. 10.

The carbon nanotubes are carried from the first fluidized bed reactor 318 in a reactor effluent stream 320. The reactor effluent stream 320 may be at a temperature of about 1650° F. (about 900° C.) and may be cooled by exchanging heat with the combined gas stream 308, for example, providing some or all of the heat used to heat the reactants. Either prior to or after cooling, the reactor effluent stream 320 is passed through a separation device 322, such as a cyclonic separator, to remove the carbon nanotubes 324. The resulting waste gas stream 326 can used to provide heat to the combined gas stream 308 in the heat exchanger 310. The carbon may also be removed in secondary separation devices (not shown) at lower temperatures than the waste gas stream 326.

After providing heat to the combined gas stream 308, the cooled waste stream 328 is passed through an ambient temperature heat exchanger 330 and then fed to a separation vessel 332. Water 334 settles in the separation vessel 332 and is removed from the bottom. The resulting gas stream 336 is at around 100° F. (about 38° C.) and at a pressure of about 540 psia (about 3,720 kPa). In one embodiment, the gas is then dried to a low dew point in a drier (not shown). The stream enters a compressor 338 that increases the pressure of the gas stream 336 to about 1050 psia (about 7,240 kPa) forming a high pressure stream 340 which is passed through another ambient temperature heat exchanger 342. From the ambient temperature heat exchanger 342, the high pressure stream 340 is fed to a separation vessel 344 for removal of any remaining water 334, for example, if a drier has not been used.

In embodiments in which the $CO_2$ is in excess in the feed gas 302, the dried gas stream 346 is then sent to a gas fractionation system 348, which separates the excess feed 350 from the recycle gas 304. In reaction systems 300 based on a proportionate excess of $CO_2$, the excess feed 350 may primarily include $CO_2$ and the recycle gas 304 may primarily include $CH_4$. In reaction systems 300 based on a proportionate excess of $CH_4$, the excess feed 350 will not have a substantial $CO_2$ content, and a portion may be recycled without further purification. In some embodiments, a portion of the excess feed 350, the recycle gas 304, or both may be tapped to provide a fuel gas stream, a purge gas stream, or both for use in the plant.

The reaction conditions used can cause significant degradation of metal surfaces, as indicated by choice of the catalyst itself, which may include stainless steel beads. Accordingly, the process may be designed to decrease the amount of metal exposed to the process conditions, as discussed further with respect to the following figures.

Figure 4:
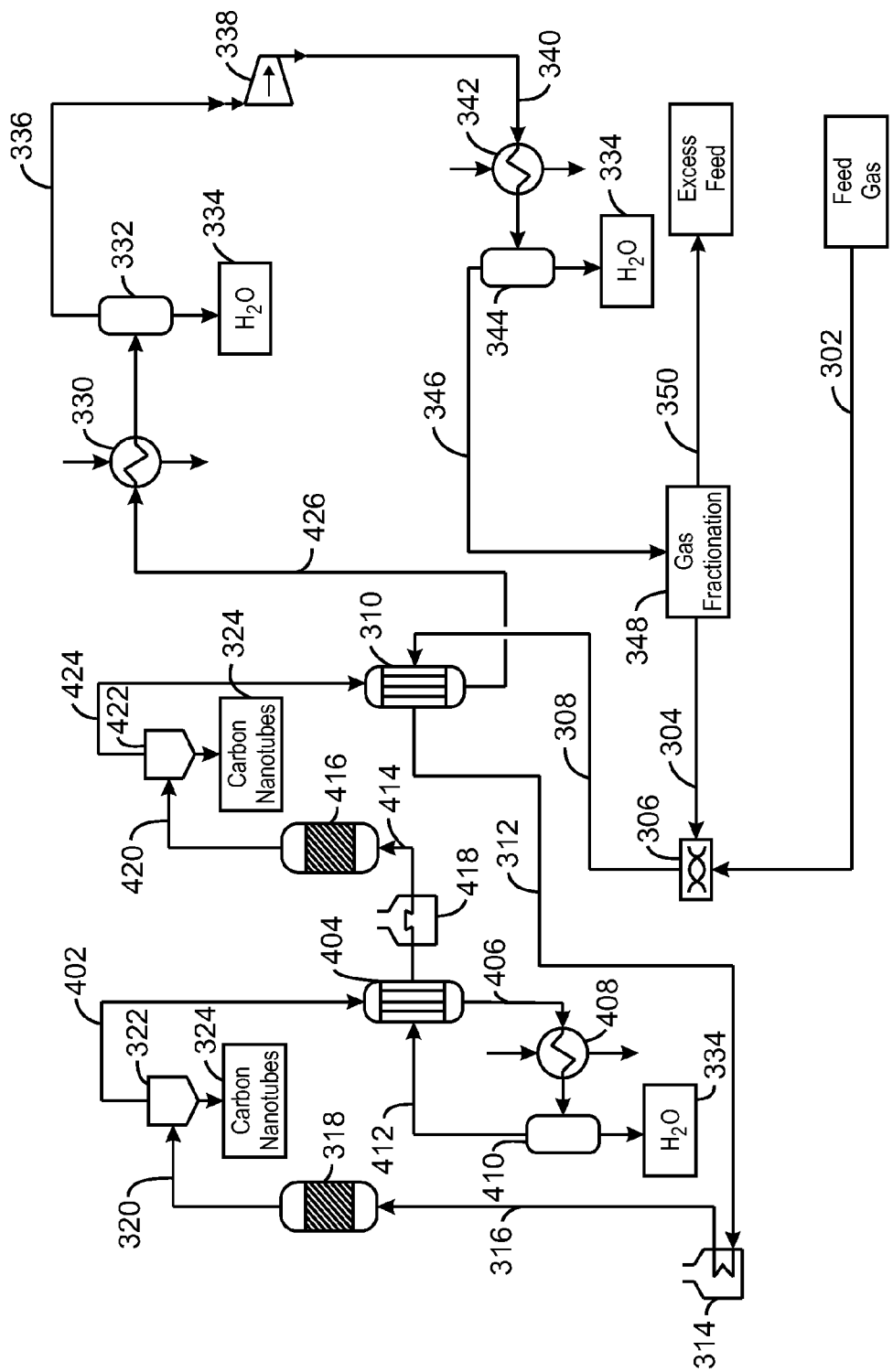
FIG. 4 is a simplified process flow diagram of a two reactor system for making carbon nanotubes from a gas feed that includes carbon dioxide and methane.

FIG. 4 is a simplified process flow diagram of a two reactor system 400 for making carbon nanotubes from a gas feed that includes carbon dioxide and methane. Like numbered items are as discussed with respect to FIG. 3. In the two reactor system 400, the resulting waste gas stream 402 is used to provide heat in a heat exchanger 404. The carbon may also be removed in secondary separation devices (not shown) at lower temperatures than the waste gas stream 402. This is particularly easy to do where multiple heat exchangers in parallel may be used to cool the waste gas stream 402 while heating the feed gas to the next reactor in a sequence. Normally, all of the carbon solids will be removed by separation device(s) prior to the condensation of any of the water vapor present in the waste gas stream 402.

The cooled waste gas stream 406 is then passed through an ambient temperature heat exchanger 408, which further cools the cooled waste gas stream 406 and results in the bulk of the water formed condensing as a liquid, which is then fed to a separation vessel 410. Water 334 is removed from the separation vessel, and a reactant stream 412 exits the top of the separation vessel 410 at about 100° F. (about 38° C.).

The reactant stream 412 passes through the heat exchanger 404 and is heated by waste heat from the waste gas stream 402. The heated stream 414 is the fed to a second fluidized bed reactor 416 in which additional carbon nanotubes are formed. However, the heated stream 414 may not be at a sufficiently high temperature, e.g., greater than about 1600° F. (about 871° C.), to form carbon nanotubes in the second fluidized bed reactor 416. To increase the temperature of the heated stream 414, a second package heater 418 may be used. The second package heater 418 may be a separate heating zone in the first package heater 314. In some embodiments, a second reactor effluent stream 420 is used to provide heat to the heated stream 414. The second reactor effluent stream 420 is then fed to a second separator 422, such as a cyclonic separator, to separate carbon products from the second reactor effluent stream 420. The resulting waste gas stream 424 is used to provide heat to the combined gas stream 308 as it passes through the heat exchanger 310.

Although only two fluidized bed reactors 318 and 416 are shown in this embodiment, the reaction system 400 may contain more reactors if desired. The determination of the number of reactors can be based on the concentration of the feedstocks and the desired remaining amount of each feedstock. In some circumstances, three, four, or more reactors may be used in sequence, in which an effluent stream from each reactor provides heat to a feed gas for the next reactor in the sequence. Further, the reactors do not have to be fluidized bed reactors, as other configurations may be used in embodiments. For example, a fixed bed reactor, a tubular reactor, a continuous feed reactor, or any number of other configurations may be used. As noted, in embodiments in which the $CH_4$ is in excess, the gas fractionation system 348 can be replaced with a manifold that can divide the dried gas stream 346 into the excess feed 350 and a recycle gas 304.

Figure 5:
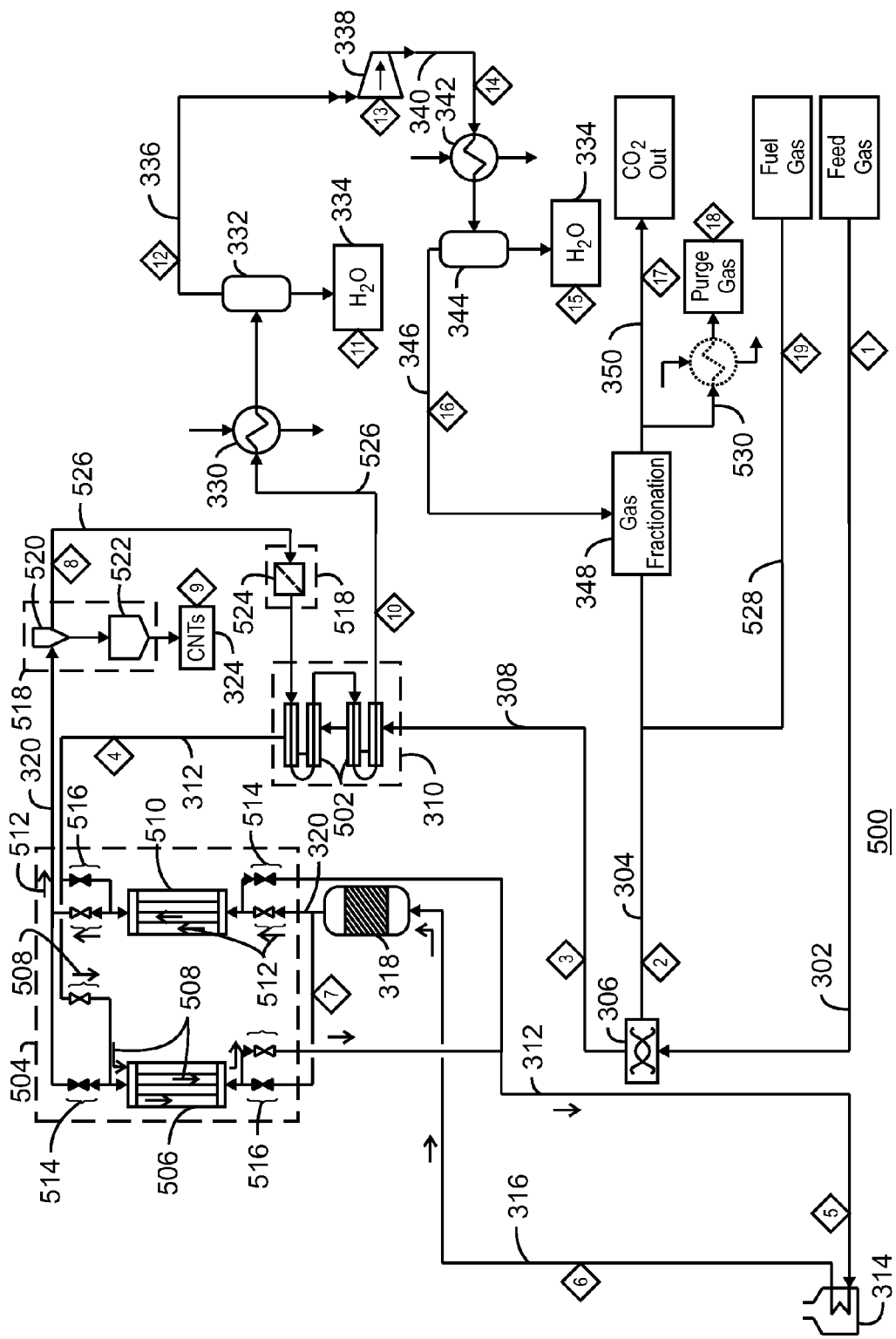
FIG. 5 is a simplified process flow diagram of a one reactor system for making carbon nanotubes from a gas feed that includes carbon dioxide and methane, in which the carbon dioxide is in excess.

FIG. 5 is a simplified process flow diagram of a one reactor system 500 for making carbon nanotubes from a gas feed that includes carbon dioxide and methane, in which the carbon dioxide is in excess. In FIG. 5, like number items are as described with respect to FIG. 3. The numbered diamonds in the process correspond to simulated process values, as provided in Table 1 for a higher $CO_2$ content feed gas 302. As for FIG. 3, the feed gas 302 passes through a static mixer 306 where it is combined with a recycle gas 304, which is high in methane. The combined gas stream 308 is passed through a heat exchanger 310, for example, including multiple shell and tube heat exchangers 502. The main difference between the more detailed process flow diagram of FIG. 5 and that of FIG. 3 is the use of heat exchangers to cool the reactor effluent stream 320 prior to separating the CNTs from the reactor effluent stream 320.

In this embodiment, the heated gas stream 312 is raised to a temperature of about 800° F. (about 427° C.) in the heat exchanger 310 prior to flowing through a second heat exchanger 504. In the second heat exchanger 504, the heated gas stream 312 flows through a first ceramic block heat exchanger 506, as indicated by arrows 508. Heat stored in the first ceramic block heat exchanger 506 is exchanged to the heated gas stream 312 and may increase the temperature to about 1540° F. (838° C.).

While the first ceramic block heat exchanger 506 is used to heat the heated gas stream 312, a second ceramic block heater 510 is used to cool the reactor effluent stream 320 by flowing this stream through the second ceramic block heater 510, as indicated by arrows 512. When the second ceramic block heat exchanger 510 reaches a selected temperature, or the first ceramic block heat exchanger 506 drops to a selected temperature, the positions of the inlet valves 514 and outlet valves 516 are changed. In other words, open valves are closed and closed valves are opened. The change in the positions of the valves changes which ceramic block heat exchanger 506 or 510 is being heated by the flow from the reactor 318 and which ceramic block heat exchanger 506 or 510 is used to heat the heated gas stream 312.

The heat may not be sufficient to increase the temperature sufficiently for reaction. Thus, as described with respect to FIG. 3, a package heater 314 can be used to further boost the temperature of the heated gas stream 312, forming the hot gas stream 316, which can be fed to the fluidized bed reactor 318. CNTs are formed in the fluidized bed reactor 318, and carried out in the reactor effluent stream 320.

TABLE 1

Process values for Higher Carbon Dioxide Feed for One Reactor System

| No. | Contents (% are mol %) | T ° F. (° C.) | P PSIA (kPa) | Flow MSCFD (m³/hr) |
|---|---|---|---|---|
| 1 | 20% CH₄/ 80% CO₂ | 100 (37.8) | 590 (4,068) | 42 (49,553) |
| 2 | Recycle Gas 98% CH₄/ 2% CO₂ | 50 (23.9) | 590 (4,068) | 154 (182,000) |
| 3 | | 74 (23.3) | | |
| 4 | | 667 (352.8) | | |
| 5 | | 1529 (832) | | |
| 6 | 20% CH₄/ 49% CO₂ 23% CO/ 8.2% H₂ | 1650 (899) | 570 (3,930) | 84 (99,106) |
| 7 | | 1579 (859) | | |
| 8 | | 791 (422) | | |
| 9 | Carbon nanotubes | | | 162.7 tons/day (182,000 kg/day) |
| 10 | Purge return | 150-700 (66-371) | 550 (3,792) | <0.1 (<118) |
| 11 | Water | | | 53 GPM (201 L/min) |
| 12 | | 100 (37.8) | 550 (3,792) | |
| 13 | Compression energy in | | | 8990 BHP (3,190 kW) |
| 14 | | | 1,320 (9,100) | |
| 15 | H₂O | | | 0.2 GPM (0.8 L/min) |
| 16 | | 100 (37.8) | 1,310 (9032) | 72 (85,000) |
| 17 | 1% CH₄/ 99% CO₂ | 63 (17) | 2000 (13,800) | 23 (27,100) |
| 18 | Purge gas | 41-45 (5-7) | 602 (4,151) | <0.1 (<118) |
| 19 | Fuel Gas | 50 (10) | 590 (4,068) | 5.4 (6,371) |

After flowing through the second ceramic block heater 510, the reactor effluent 320 is flowed to a separation system 518, which is used to remove the CNTs from the reactor effluent 320. In this embodiment, the separation system 518 for the CNTs includes a cyclonic separator 520, a lock hopper 522, and a filter 524. After the majority of the CNTs are removed by the cyclonic separator 520 and deposited into the lock hopper 522, the filter 524 is used to remove remaining CNTs from the waste gas stream 526. This may help to prevent plugging, or other problems, caused by residual CNTs in the waste gas stream 526. The filter 524 can include bag filters, sintered metal filters, and ceramic filters, among other types. From the CNT separation systems 518, the CNTs may be directed to a packaging system, as discussed in further detail with respect to FIG. 10. After the filter 524, the waste gas stream 526 is flowed through the heat exchanger 310 before flowing to the ambient temperature heat exchanger 330 and then fed to a separation vessel 332 for separation of the water. After flowing through the separation vessel 332, the flow is as described with respect to FIG. 3.

In this embodiment, two extra streams may be provided from the separated streams out of the gas fractionation system 348. A fuel gas stream 528 may be taken from the recycle gas 304 and sent to a power plant, such as power plant 134 (FIG. 1). A purge gas stream 530 may be taken from the CO₂ outlet stream, which can be used to purge various pieces of equipment, such as the filter 524 or cyclone 520.

Figure 6A:
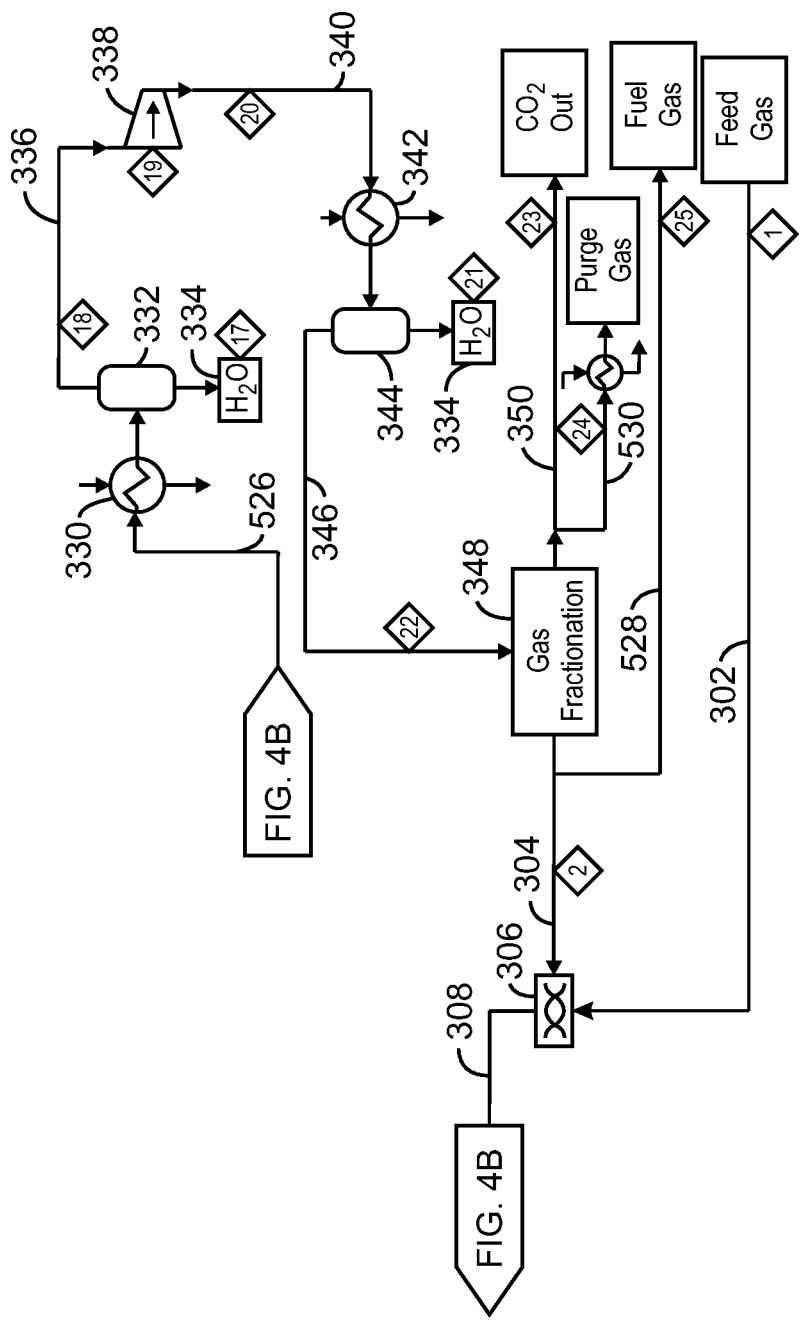
FIGS. 6A, 6B, and 6C are simplified process flow diagrams of a two reactor system for making carbon nanotubes from a gas feed that includes carbon dioxide and methane, in which the carbon dioxide is in excess.
Figure 6B:
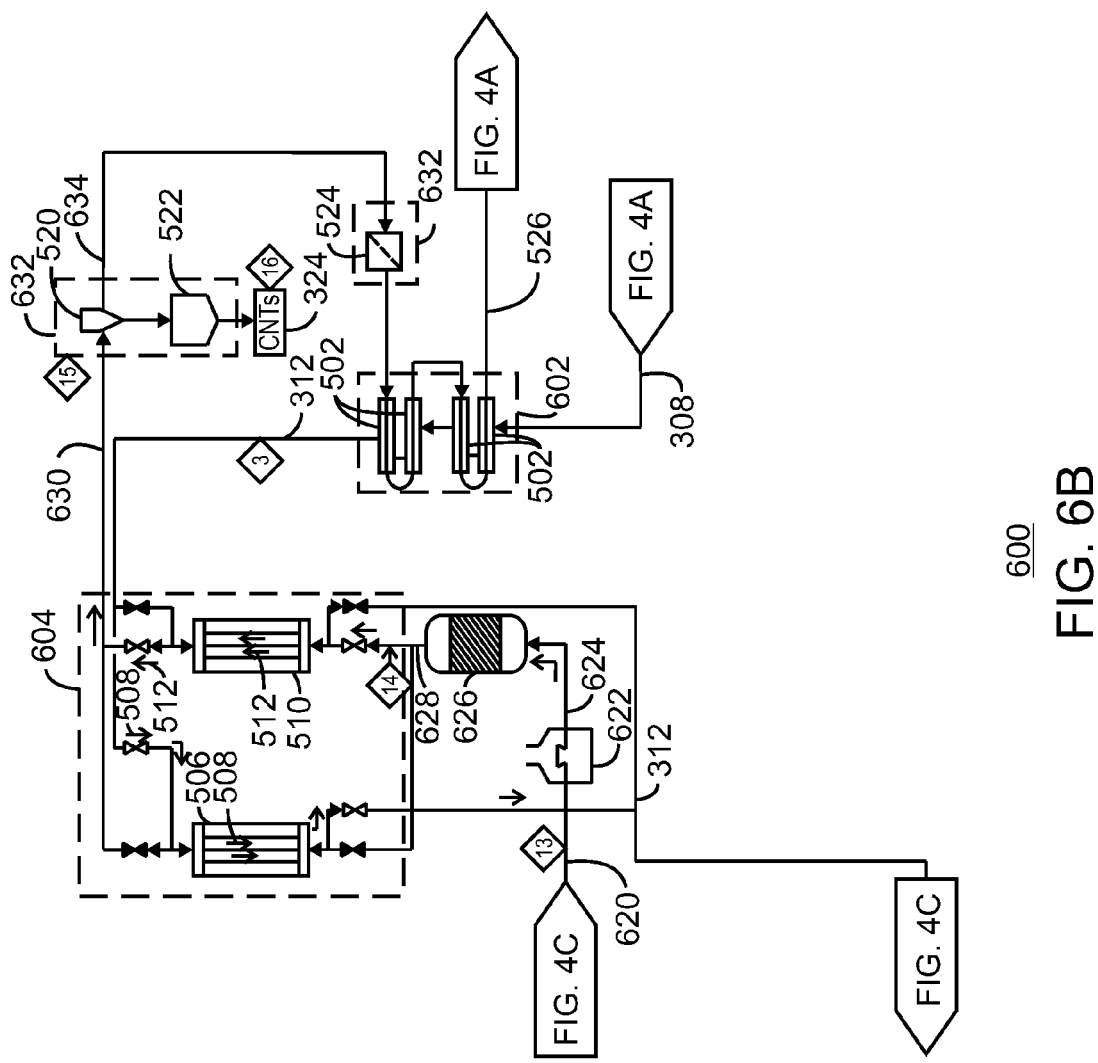
Figure 6C:
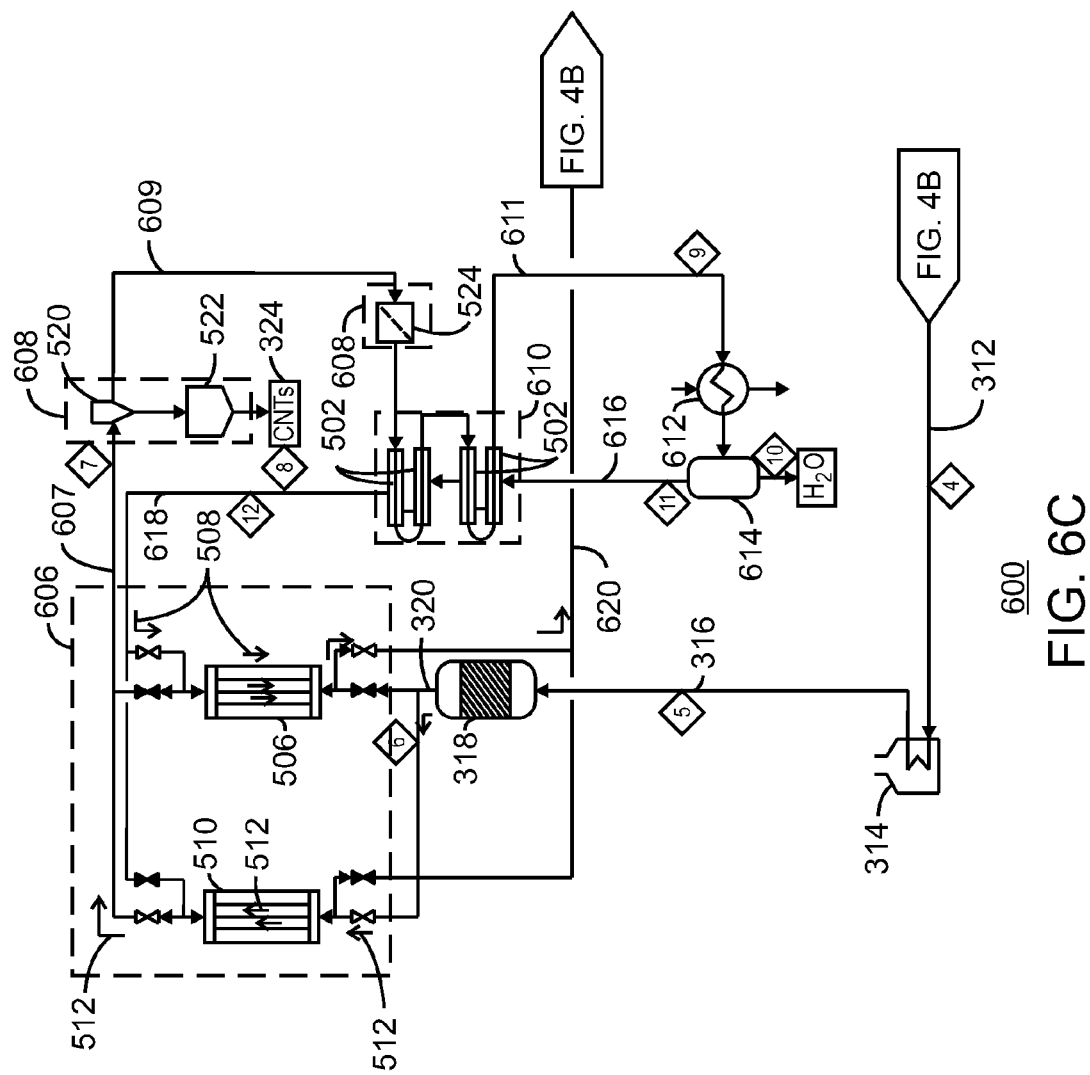

FIGS. 6A, 6B, and 6C are simplified process flow diagrams of a two reactor system 600 for making carbon nanotubes from a gas feed that includes carbon dioxide and methane, in which the carbon dioxide is in excess. Like numbered items are as described with respect to FIGS. 3 and 5. The primary difference between the embodiment illustrated in FIG. 5 and that shown in FIGS. 6A-6C is the use of a second reactor to provide another amount of CNTs from remaining reactants in the effluent from the first reactor.

As described with respect to the one reactor system 500 (FIG. 5), the flow begins when the feed gas 302 is blended with a recycle gas 304 in a static mixer 304. The combined gas stream 308 is passed through a heat exchanger 602 to be heated by a hot waste gas stream from a reactor effluent. The heat exchanger 602 may be similar to that described for heat exchanger 310 in FIG. 5. From the heat exchanger 602, the heated gas stream 312 passes through a second heat exchanger 604, which can use ceramic block heat exchangers 506 and 510 to further heat the heated gas stream 312, as described for the second heat exchanger 504 of FIG. 5. The resulting high temperature heated gas stream 312 can be further heated in a package heater to form the hot gas stream 316, which can be fed to the fluidized bed reactor 318. CNTs are formed in the fluidized bed reactor 318, and carried out in the reactor effluent stream 320.

The reactor effluent stream 320 can be flowed into a heat exchanger 606, in which the flow is cooled in a ceramic block heat exchanger 510, as indicated by arrows 512. From the heat exchanger 606, the cooled effluent stream 607 can be flowed to a separation system 608 in which the CNTs are separated from the cooled effluent stream 607, for example, in a cyclonic separator 520, as described with respect to FIG. 5. The resulting waste gas stream 609 can be flowed through a filter 524 in the separation system 608 to remove most of the remaining CNTs. After the filter 524, the waste gas stream 609 is flowed through the heat exchanger 610 before flowing to the ambient temperature heat exchanger 612 and flowing to a separation vessel 614 for separation of the water. The resulting dry stream 616 can then be flowed through the heat exchanger 610 to be heated by exchanging heat with the waste gas stream 609. The heat exchanger 610 may include shell-and-tube heat exchangers 422 that, in this case, raise the temperature of the dry stream 616 from about 100° F. (about 37.8° C.), at point 11, to about 715° F. (about 379.4° C.) at point 12. The heated gas stream 618 is further heated by flowing through a ceramic block heater 506 in a second heat exchanger 606.

A package heater 622 may be used to provide a further amount of heat to bring the heated gas stream 618 up to a temperature sufficient for reaction. The final hot gas stream 624 is fed to a second fluidized bed reactor 626, which forms another aliquot of CNTs.

The CNTs are carried out of the second fluidized bed reactor 626 in a reactor effluent stream 628, which is flowed through a second ceramic block heat exchanger 510 for cooling. From the second ceramic block heat exchanger 510, the effluent stream 630 is flowed to a separation system 632, as described for separation system 608. After a filter 524 in the separation system 632 removes CNTs from the waste gas stream 634, the waste gas stream 634 is passed through the heat exchanger 602 for further cooling. The resulting waste gas stream 526 is passed to the ambient temperature heat exchanger 330 to condense out the water.

The ceramic block heat exchangers 506 in the second heat exchanger 606 are configured to have an exchanged flow, as discussed with respect to the second heat exchanger 504 in FIG. 5. Other portions of the system 600 are similar to that described with respect to FIGS. 3 and 5, although the process values can differ. Relevant process values for the system are shown in Table 2 or Table 3 for simulations of the two reactor system. Furthermore, more than two reactor systems may also be used in embodiments.

As discussed with respect to the previous figures, after the removal of a final aliquot of water from the high pressure stream 340 in a third separation vessel 344, the dried gas stream 346 is sent to a gas fractionation system 348, which can remove a high methane recycle gas 304 from a $CO_2$ waste stream 350. The gas fractionation system 348 is discussed further with respect to FIG. 11.

TABLE 2

Process values for Higher Carbon Dioxide Feed for Two Reactor System

| No. | Contents (% are mol %) | T ° F. (° C.) | P PSIA (kPa) | Flow MSCFD (m³/hr) |
|---|---|---|---|---|
| 1 | 20% CH₄/ 80% CO₂ | 100 (37.8) | 590 (4,068) | 52 (61,351) |
| 2 | 98% CH₄/ 2% CO₂ | 75 (23.9) | 590 (4,068) | 154 (182,000) |
| 3 | | 766 (408) | | |
| 4 | | 1539 (837) | | |
| 5 | 51% CH₄/ 49% CO₂ | 1620 (882) | 570 (3,930) | 207 (244,000) |
| 6 | | 1624 (884) | | |

TABLE 2-continued

Process values for Higher Carbon Dioxide Feed for Two Reactor System

| No. | Contents (% are mol %) | T ° F. (° C.) | P PSIA (kPa) | Flow MSCFD (m³/hr) |
|---|---|---|---|---|
| 7 | | 800 (427) | | |
| 8 | Carbon nanotubes | | | 162.7 tons/day (148,000 kg/day) |
| 9 | Purge return | 150-700 (66-371) | 550 (3,792) | <0.1 (<118) |
| 10 | Water | | | 39 GPM (148 L/min) |
| 11 | | 100 (37.8) | | |
| 12 | | 715 (349.4) | | |
| 13 | | 1599 (870.6) | 540 (3,723) | |
| 14 | | 1603 (872.8) | | |
| 15 | | 800 (427) | | |
| 16 | Carbon nanotubes | | | 57.5 tons/day (52,000 kg/day) |
| 17 | Water | | | 14 GPM (53 L/min) |
| 18 | | 100 (37.8) | 520 (3,585) | |
| 19 | Compression energy in | | | 8990 BHP (6,700 kW) |
| 20 | | | 1,075 (7,412) | |
| 21 | H₂O | | | 0.6 GPM (2.3 L/min) |
| 22 | | 100 (37.8) | 1,065 (7,343) | 193 (228,000) |
| 23 | 1% CH₄/ 99% CO₂ | 40 (4.4) | 502 (3461) | 34 (40,114) |
| 24 | Purge gas | 75 (23.9) | 592 (4082) | <0.1 (<118) |
| 25 | Fuel Gas | 75 (23.9) | 590 (4068) | 4.3 (5,100) |

TABLE 3

Process values for Higher Carbon Dioxide Feed for Two Reactor System

| No. | Contents (% are mol %) | T ° F. (° C.) | P PSIA (kPa) | Flow MSCFD (m³/hr) |
|---|---|---|---|---|
| 1 | 20% CH₄/ 80% CO₂ | 100 (37.8) | 590 (4,068) | 42 (49,600) |
| 2 | 9.88% CH₄/ 19.23% CO₂ 58.5% CO/ 12.4% H₂ | 65 (18.3) | 590 (4,068) | 18.2 (21,500) |
| 5 | 17% CH₄/ 62% CO₂ 58.5% CO/ 12.4% H₂ | 1,650 (899) | 570 (3,930) | 60.3 (71,100) |
| 6 | | 1,515 (824) | 570 (3,930) | 62.4 (73,600) |
| 8 | Carbon nanotubes | | | 134 tons/d (122,000 kg/day) |
| 13 | 9% CH₄/57% CO₂ 24% CO/ 6.9% H₂ | 1,600 (871) | 530 (3,654) | |
| 14 | 4.9% CH₄/ 50.5% CO₂ 27.0% CO/ 5.7% H₂ | 1,552 (844) | 570 (3,930) | |
| 16 | Carbon nanotubes | | | 63.0 tons/d (57,000 kg/day) |
| 20 | | | 1,075 (7,412) | |
| 17 | H₂O | | | 0.6 GPM (2.3 L/min) |
| 18 | | 100 (37.8) | 1,065 (7,343) | 193 (228,000) |
| 23 | 1% CH₄/ 99% CO₂ | 63 (17.2) | 2,000 (13,790) | 25 (29,500) |
| 25 | FUEL GAS | 65 (18.3) | 590 (4,068) | 7.2 (8,495) |

The individual streams 304 and 350 can be used to supply other gases for the process. For example, a fuel gas stream 528 may be removed from the high methane recycle gas 304 and used for powering turbines, boilers, or other equipment in order to provide power to the system 600 or to an electric grid. Further, a purge gas stream 530 may be removed from the CO2 waste stream 350. The purge gas stream 530 may be used for cooling and purging the CNTs, as described with respect to FIG. 12. The purge gas may also be used for various cleaning functions in the plant, such as blowing residual CNTs out of a ceramic heat exchanger 506 or 510 when flow is reversed.

The process conditions shown in Tables 2 and 3 are merely intended to be examples of conditions that may be found in a plant, as determined by simulations. The actual conditions may be significantly different and may vary significantly from the conditions shown. A similar plant configuration may be used for a high methane feed gas, as discussed with respect to FIGS. 7 and 8. Further, the recycle and effluent waste streams can contain substantial quantities of hydrogen and carbon monoxide, e.g., greater than about 5 mol % each, 10 mol % each, or even 20 mol % of each component. These components will generally be present in the feed and all non-$CO_2$ product streams, i.e., the recycle methane will always contain some CO and $H_2$.

Figure 7:
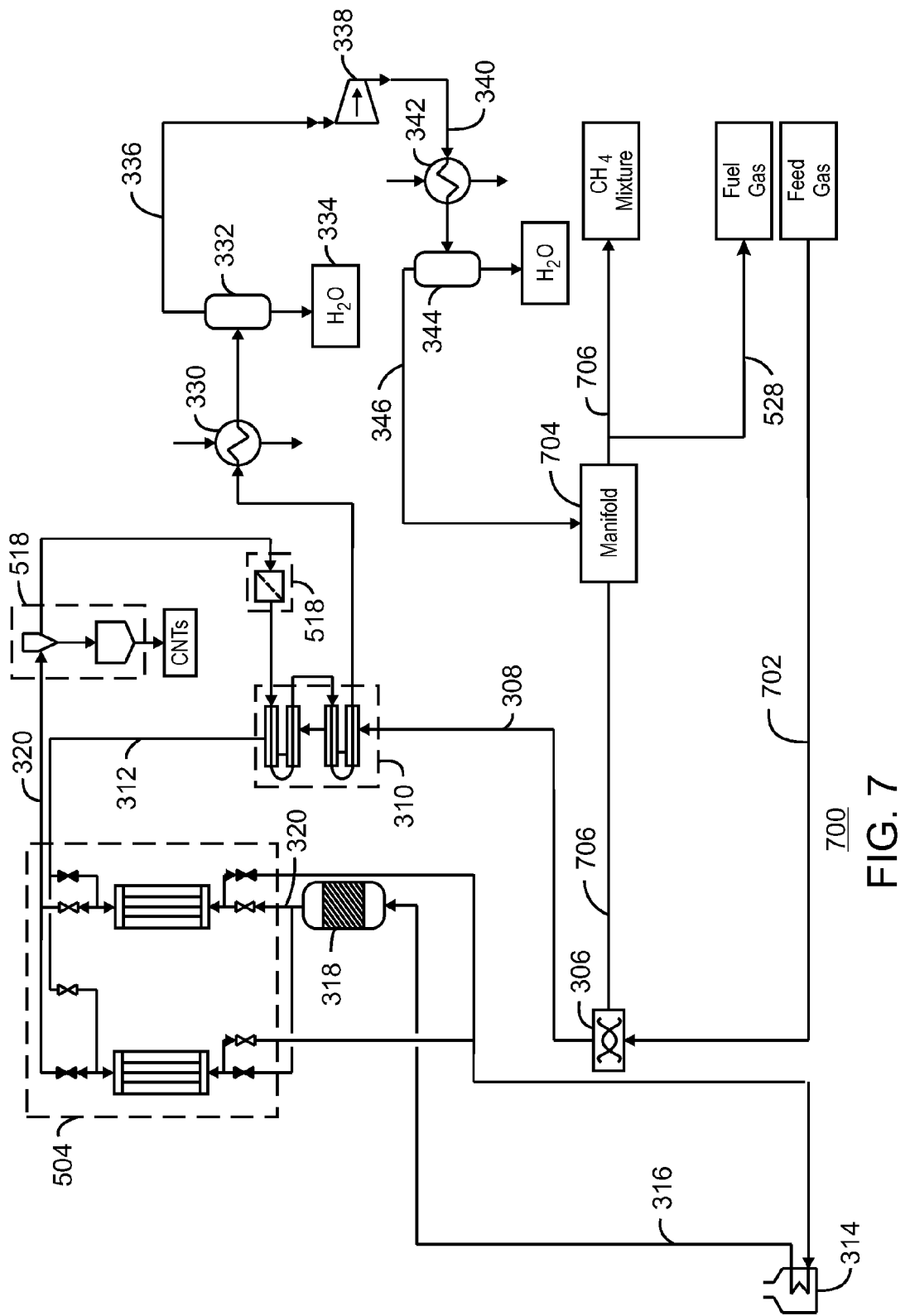
FIG. 7 is a simplified process flow diagram of a one reactor system for making carbon nanotubes from a gas feed that includes carbon dioxide and methane, in which the methane is in excess.

FIG. 7 is a simplified process flow diagram of a one reactor system 700 for making carbon nanotubes from a gas feed that includes carbon dioxide and methane, in which the methane is in excess. Like numbered items are as discussed in the previous figures, and a portion of the reference numbers have been omitted to simplify the figure. In this embodiment, the feed gas may be higher in methane than in carbon dioxide, for example, at around 80 mol % $CH_4$ and 20 mol % $CO_2$, although any ratios may be used. The high methane feed gas 702 can be used in a one reactor system 700 or a two reactor system 800 (FIG. 8) to form CNTs. These systems 700 and 800 are similar to those discussed above, except that the gas fractionation system 348 has been replaced with a manifold 704. When the gas feed 702 is high in methane, the $CO_2$ may be nearly consumed in the process. Accordingly, there may be no need for further separation.

In the manifold 704, the dried gas stream 346 can be separated into portions. A first portion forms the recycle gas 706, which is blended with the feed gas 702 in a static mixer 306 to form a combined gas stream 308 for feeding the reactor. A second portion may be used as a low BTU fuel gas 528, for example, feeding a power plant 134 located at the facility. As the dried gas stream 346 includes similar proportions of $CH_4$, CO, and $H_2$, in addition to a small amount of $CO_2$, it will require some purification before it could be sold to a pipeline. Thus, an exported stream 708 of the $CH_4$ mixture will be limited to other power plants rather than used in consumer applications.

Figure 8A:
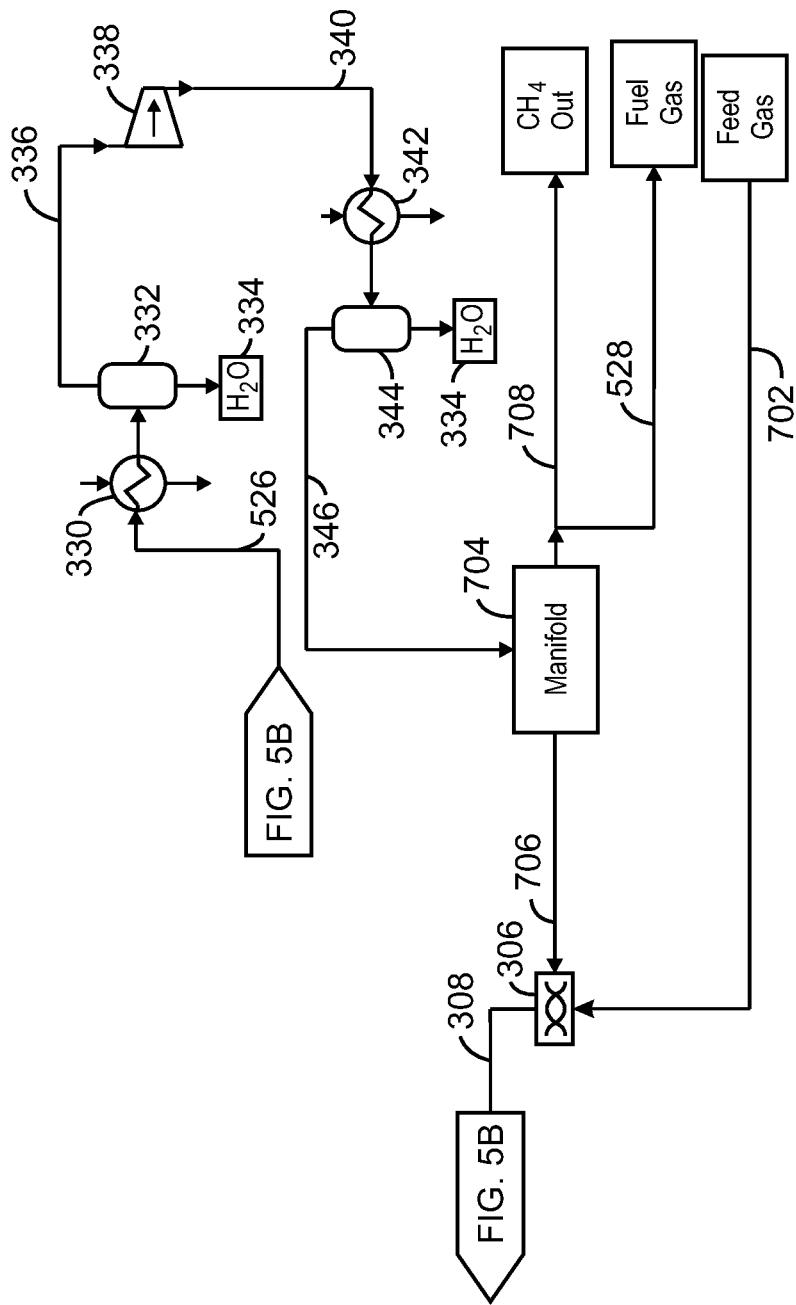
Figure 8B:
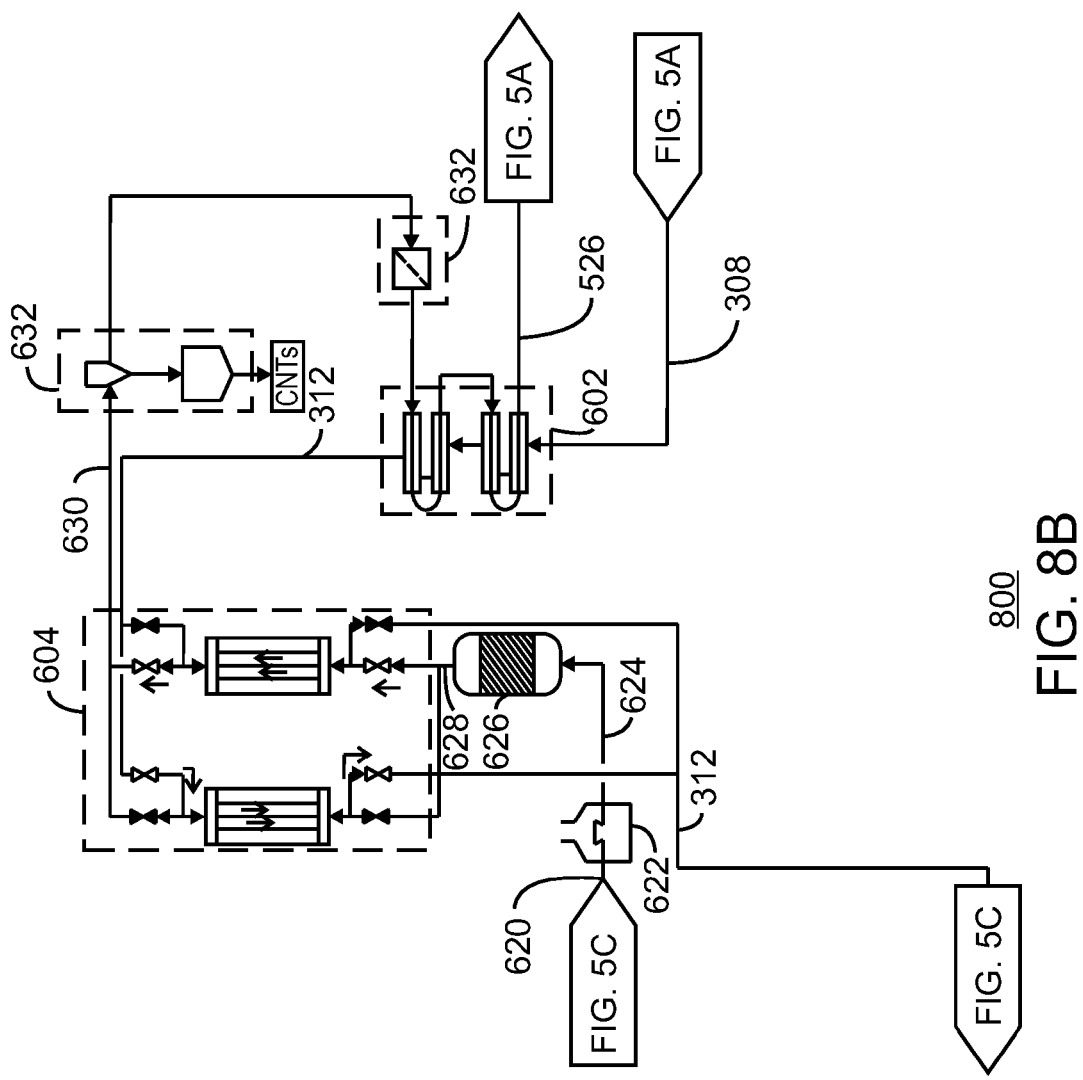

FIGS. 8A, 8B, and 8C are simplified process flow diagrams of a two reactor system for making carbon nanotubes from a gas feed that includes carbon dioxide and methane, in which the methane is in excess. Like numbered items are as discussed in previous figures and some reference numbers have been omitted to simplify the figure.

As the gas feed 702 is higher in methane, the dried gas stream 346 will have a low $CO_2$ content, making separation uneconomical. Thus, as noted for FIG. 7, the gas fractionation system may be replaced with a manifold 704. The rest of the process will be similar to the system 500 discussed with respect to FIG. 5. However, since the $CH_4$ mixture 708 may be commercially sold to energy markets, a purification system that is configured to generate a much higher purity $CH_4$, e.g., about 99 mol % $CH_4$ or higher, may be used.

It can be understood that the systems for the formation of carbon nanotubes may include any number of reactors, of any number of types, including the fluidized bed reactors shown. In one embodiment, more than two reactors may be used to form the carbon nanotubes.

Reactor Systems

Figure 9:
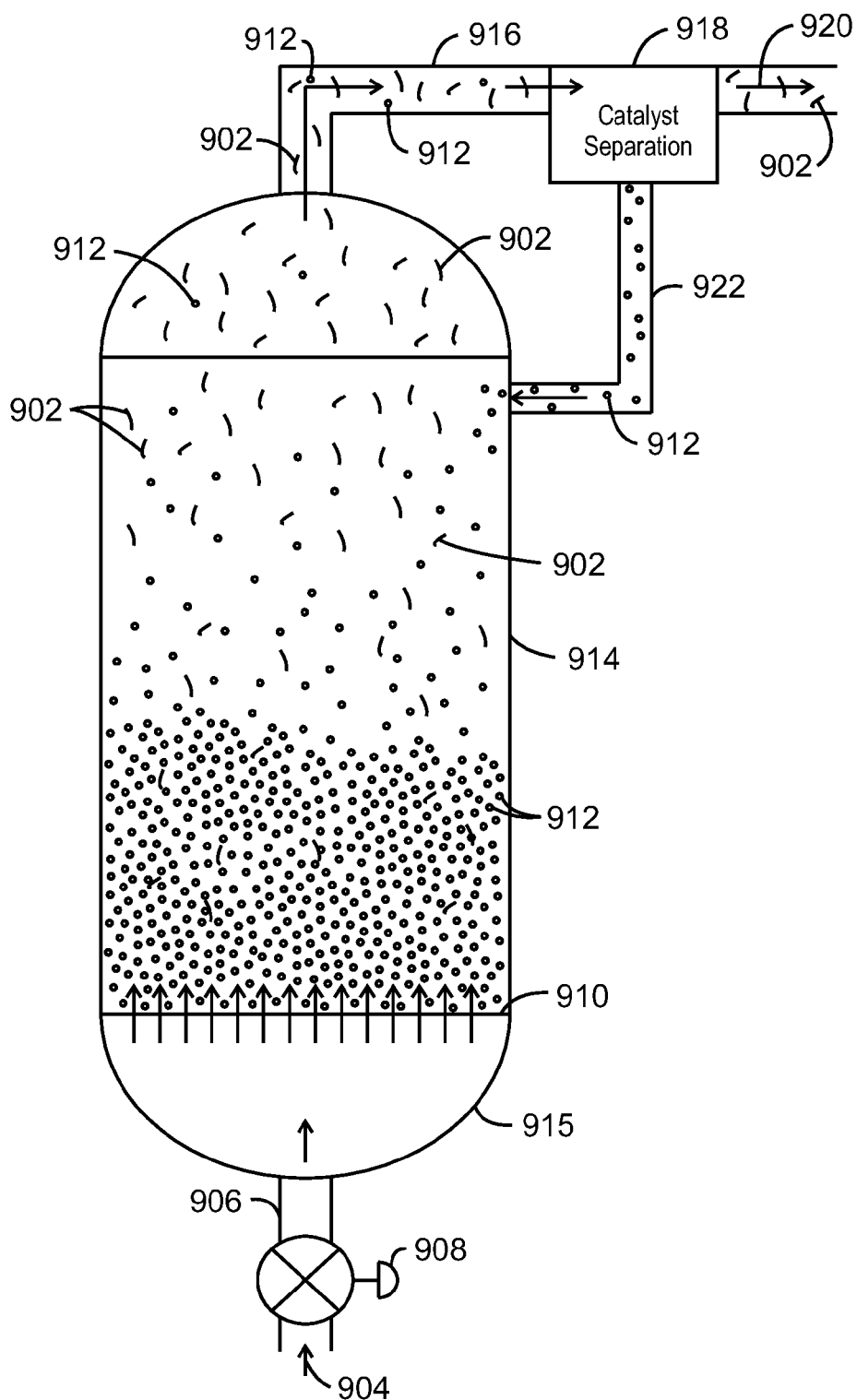
FIG. 9 is a drawing of a fluidized bed reactor for forming carbon nanotubes.

FIG. 9 is a drawing of a fluidized bed reactor 900 for forming carbon nanotubes 902. A hot gas feed stream 904 is fed through a line 906 into the bottom of the fluidized bed reactor 900. A control valve 908 may be used to regulate the flow of the hot gas feed stream 904 into the reactor. The hot gas feed stream 904 flows through a distributor plate 910 and will fluidize a bed of catalyst beads 912 held in place by the reactor walls 914. As used herein, "fluidize" means that the catalyst beads 912 will flow around each other to let gas bubbles through, providing a fluid-like flow behavior. As discussed herein, the reaction conditions are very harsh to any exposed metal surface, as the metal surface will perform as a catalyst for the reaction. Thus, the reaction will result in the slow degradation of an exposed metal surface. Accordingly, the interior surface of the reactor, including the reactor walls 914 and heads 915, as well as the distributor plate 910, and other parts, can be made of a ceramic material to protect the surfaces.

As the hot gas feed stream 904 flows through the fluidized bed of catalyst particles 912, CNTs 902 will form from catalyst beads 912. The flowing hot gas feed stream 904 carries the CNTs 902 into an overhead line 916 where they are removed from the reactor 900. Depending on the flow rate, for example, as adjusted by the control valve 908, some amount of catalyst beads 912, or particles fragmented from the catalyst beads 912, may be carried into the overhead line 916. Accordingly, a catalyst separator 918 may be used to separate catalyst beads 912, and larger particles, from a reactor effluent stream 920 and return them to the reactor 900 through a recycle line 922. Any number of configurations may be used for the catalyst separator 918, including a cyclonic separator, a settling tank, a hopper, and the like. The reactions that take place in the fluidized bed are discussed in more detail in FIG. 10.

Figure 10:
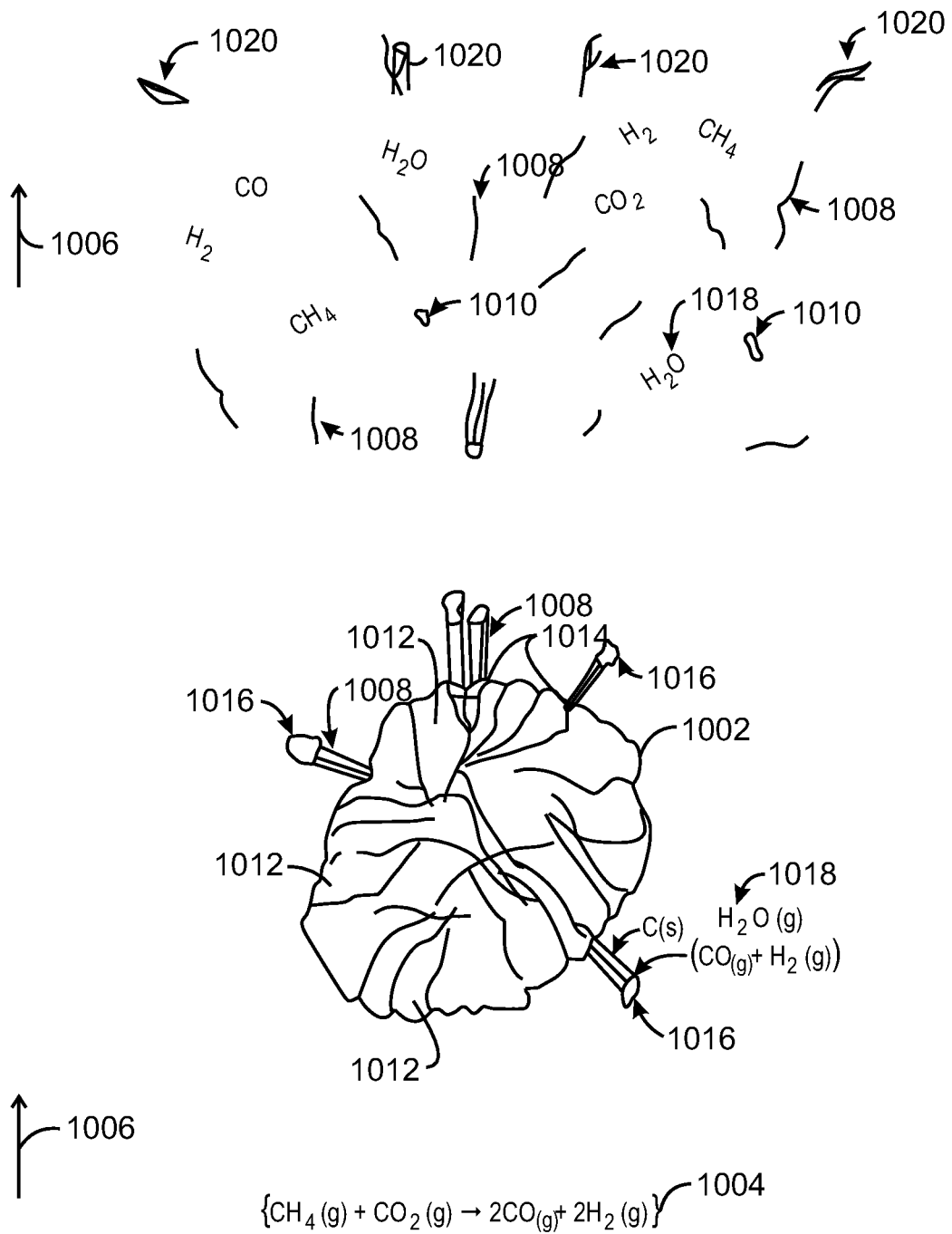
FIG. 10 is a schematic of a catalytic reaction for the formation of carbon nanotubes on a catalyst bead.

FIG. 10 is a schematic of a catalytic reaction 1000 for the formation of carbon nanotubes on a catalyst bead 1002. An initial reaction 1004 between a portion of the $CH_4$ and the $CO_2$ in the hot gas feed stream 1006 results in the formation of CO and $H_2$ in stoichiometric amounts. Excess amounts of the source gases 1006 continue to flow through the reactor, helping to fluidize the bed and carrying away CNTs 1008 and catalyst particles 1010.

The reactions that form the CNTs 1008 take place on the catalyst bead 1002. The size of the CNTs 1008, and the type of CNTs 1008, e.g., single wall or multiwall CNTs 1008, may be controlled by the size of the grains 1012. In other words, a nucleus of iron atoms of sufficient size at the grain boundary forms the nucleating point for the growth of the carbon products on the catalyst bead 1002. Generally, smaller grains 1012 will result in fewer layers in the CNTs 1008, and may be used to obtain single wall CNTs 1008. Other parameters may be used to affect the morphology of the final product as well, including reaction temperature, pressure, and feed gas flow rates.

The CO and $H_2$ react at grain boundaries 1014, lifting active catalyst particles 1016 off the catalyst bead 1002, and forming $H_2O$ 1018 and the solid carbon of the CNTs 1008. The CNTs 1008 break off from the catalyst bead 1002 and from the catalyst particle 1010. Larger catalyst particles 1010 can be captured and returned to the reactor, for example, by the catalyst separator 918 discussed with respect to FIG. 9, while very fine catalyst particles 1010 will be carried out with the CNTs 1008. The final product will include about 95 mol % solid carbon and about 5 mol % metal, such as iron. The CNTs 1008 will often agglomerate to form clusters 1020, which are the common form of the final product. Some amount of the CO and $H_2$ passes through the reactor without reacting and are contaminants in the reactor effluent streams.

As the reaction proceeds, the catalyst bead 1002 is degraded and finally consumed. Accordingly, the reaction can be described as a metal dusting reaction. In some embodiments, metal surfaces are protected from attack by a ceramic lining, since the metal surfaces in contact with the reaction conditions would not only degrade, but may also result in the formation of poorer quality products.

The catalyst bead 1002 can include any number of other metals, such as nickel, ruthenium, cobalt, molybdenum, and others. However, the catalytic sites on the catalyst beads 1002 are principally composed of iron atoms. In one embodiment, the catalyst bead 1002 includes metal shot, for example, about 25-50 mesh metal beads that are used for shot blasting. In one embodiment, the catalyst may be a stainless ball bearing, and the like.

Gas Fractionation System

Figure 11:
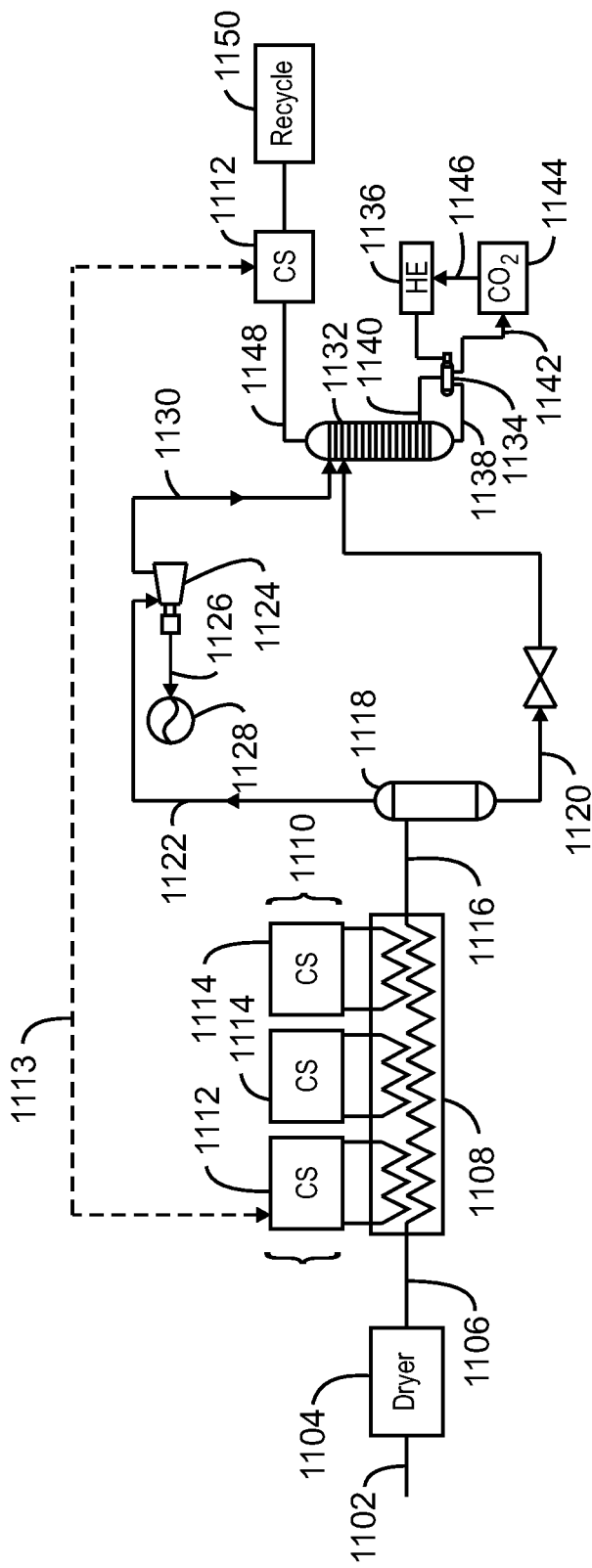
FIG. 11 is a simplified process flow diagram of a gas fractionation process that can be used to separate excess carbon dioxide feed in a reactor system for the production of carbon nanotubes.

FIG. 11 is a simplified process flow diagram of a gas fractionation system 1100 that can be used in a reactor system for the production of carbon nanotubes. The gas fractionation system 1100 is a bulk fractionation process that may be used with a high $CO_2$ reactor system, such as that discussed with respect to FIG. 4. In the gas fractionation system 1100, the feed gas 1102 is fed to a dryer 1104 to reduce the dew point to about −70° F. (about −56.7° C.), or lower. The feed gas 1102 can correspond to the dried gas stream 366 discussed with respect to FIGS. 3-5. The dryer 1104 can be a fixed or fluidized dryer bed, containing an adsorbent, such as molecular sieves, desiccants, and the like. Other dryer technologies may also be used, such as cryogenic drier systems. In some embodiments, the dryer can be located prior to the compressor 358, which may eliminate the need for the ambient temperature heat exchanger 362.

The dry gas feed 1106 is then fed through a cryogenic chiller 1108 to reduce the temperature in preparation for the separation. As $CO_2$ will condense from the gas at about −77° F. (about −61° C.), a multistage chilling system 1110 may be used to reduce the temperature to around this level. The multistage chilling system 1110 may include a heat recovery system 1112 used to heat the outlet gas with energy 1113 from the dry feed gas 1106.

The chilled feed 1116 is fed to a separation vessel 1118 to separate a liquid stream 1120 and a vapor stream 1122. The vapor stream 1122 is passed through an expander 1124 to lower the temperature by generating mechanical work 1126 in an adiabatic expansion process. In one embodiment, the mechanical work 1126 is used to drive a generator 1128, which may provide a portion of the electricity used in the plant. In another embodiment, the mechanical work 1126 is used to drive a compressor, for example, for compressing a refrigerant stream for the multistage chilling system 1110. The expansion can result in a two phase stream 1130.

The liquid stream 1120 and the two phase stream 1130 are fed to a separation column 1132, for example, at different points along the separation column 1132. Heat is supplied to the separation column 1132 by a reboiler 1134. The reboiler 1132 is heated by a stream from a heat exchanger 1136. The heat exchanger 1136 may be part of a chiller system that is warmer than the separation column 1132, although below ambient temperature. The column bottom stream 1138 is passed through the reboiler 1134 and a portion 1140 is reinjected after being warmed. An outlet stream 1142 from the reboiler 1134 provides the $CO_2$ product 1144. A portion 1146 of the $CO_2$ product 1144 may be recycled through the heat exchanger 1136 to carry energy to the reboiler 1134.

The overhead stream 1148 from the separation column 1132 is a methane enhanced stream, for example, including about 73 mol % $CH_4$ and about 23 mol % $CO_2$. As noted, the overhead stream 1148 may be used in a chiller system 1112 to cool the dry gas feed 1106, warming the overhead stream 1148 to form the recycle gas 1150. Other components may be present in the recycle gas 1150 including, for example, about 3.5 mol % CO and $H_2$. If the methane is intended for sale, such as in the high methane reaction system discussed with respect to FIG. 9, a higher purity separation system may be used, as discussed with respect to FIG. 9.

The configurations and units discussed with respect to FIG. 11 are merely exemplary. Any number of variations may be made to these systems. Further, other gas separation systems may be used in embodiments, so long as flow rates and purity levels can be achieved.

Packaging System

Figure 12:
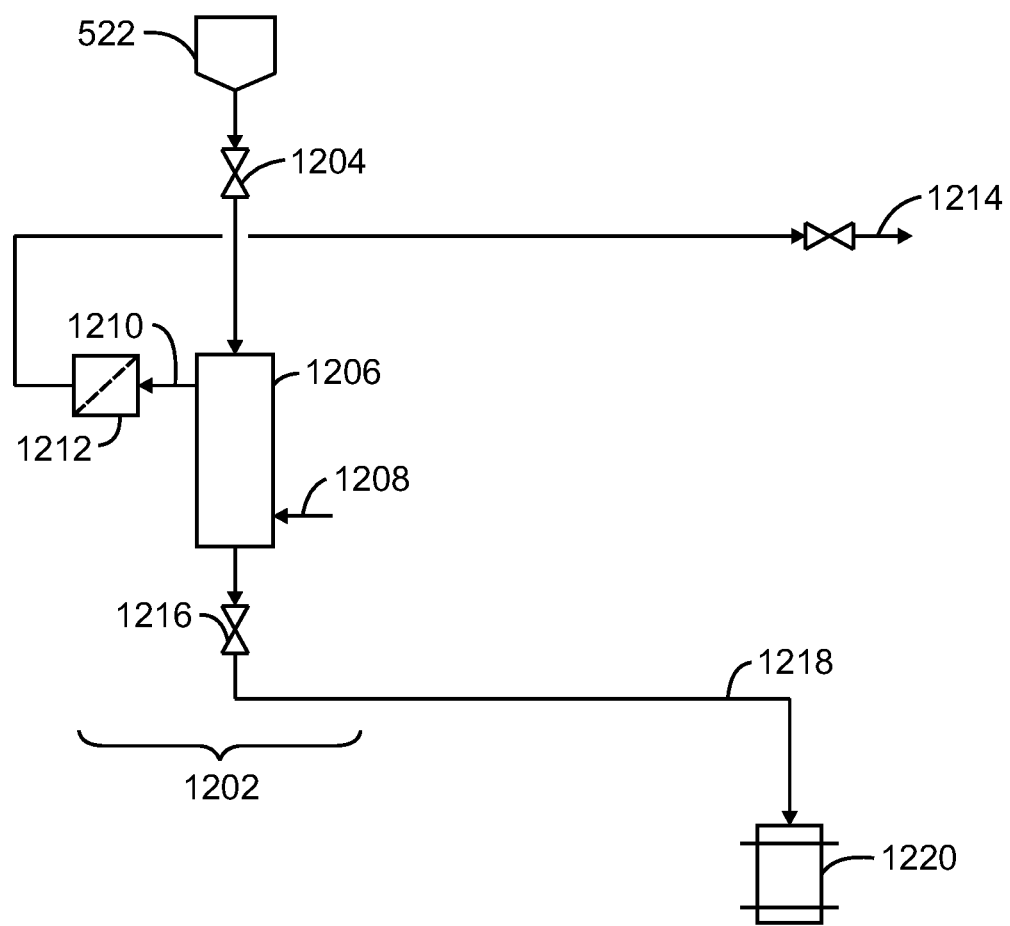
FIG. 12 is a simplified process flow diagram of a packaging system that can package carbon nanotubes separated from a reactor effluent stream from a one reactor system.

FIG. 12 is a simplified process flow diagram of a packaging system 1200 that can package carbon nanotubes separated from an effluent stream from a one reactor system. The packaging system 1200 overlaps the lock hopper 522 of the separations systems 518 and 632 shown in FIGS. 5 and 6, and is used to isolate the CNTs from the process for packaging.

The packaging system 1200 is part of a packaging train 1202. The packaging train 1202 may have a sampling valve 1204 to remove CNTs from the lock hopper 522. The sampling valve 1204 may be a rotary valve configured to allow a certain amount of CNTs and gas through during a portion of a rotation cycle. In some embodiments, the sampling valve 1204 may be a ball valve configured to open fully for a selected period of time to allow a selected amount of CNTs and gas through, prior to closing fully. The CNTs and gas are allowed to flow into a drum 1206 for purging and cooling.

After the sampling valve 1204 has closed, a purge stream 1208 may be opened into the drum 1206 to sweep out remaining gases, such as CO, $H_2$, $H_2O$, and $CH_4$. As noted, the purge stream 1208 may be taken from the $CO_2$ enriched side of the gas fractionation system, for example, as purge gas stream 530, discussed with respect to FIG. 5. The purge outlet stream 1210 will carry some amount of CNTs, and other fine particles, and may be passed through a filter 1212, prior to being sent back to the process as a purge return 1214. The filter 1212 may be a bag filter, cyclonic separator, or any other suitable separation system. After purging is completed, a packaging valve 1216 will open to allow a stream 1218 including CNTs to flow to a filling station 1220 to be packaged in drums or tanks for sale.

Figure 13:
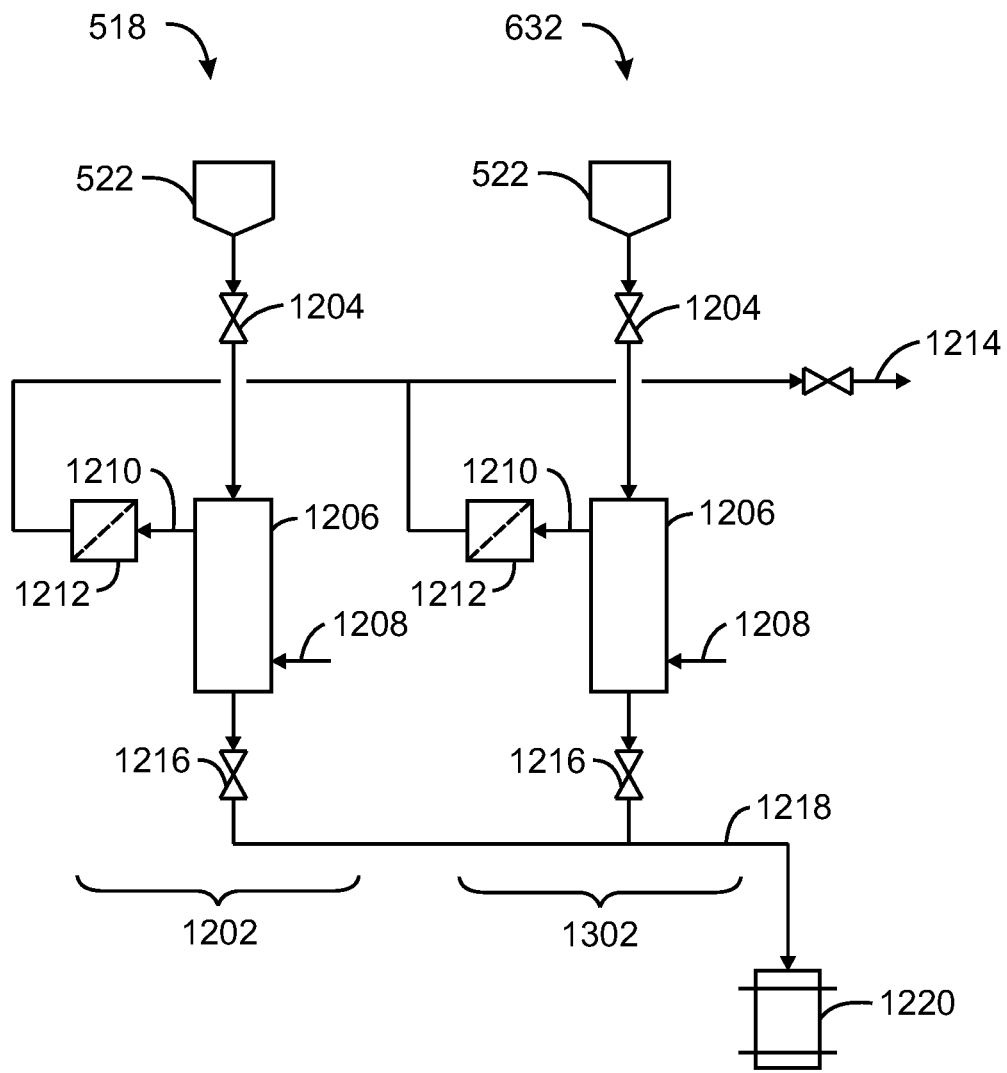
FIG. 13 is a simplified process flow diagram of a packaging system that can package carbon nanotubes separated from each reactor effluent stream in a two reactor system.

FIG. 13 is a simplified process flow diagram of a separation system 1300 that can package carbon nanotubes separated from each reactor effluent stream in a two reactor system. As shown in FIG. 13, in a two reactor system, such as discussed with respect to FIGS. 7 and 8, each reactor in the system may have a separate packaging train, such as packaging trains 1202 and 1302. The first packaging train 1202 may be coupled to lock hopper 522 of separation system 518, while the second packaging train 1302 may be coupled to the lock hopper 522 of separation system 632. As the different reactors may be producing different amounts of CNTs, the equipment may be sized differently, although the functions may be the same. For example, in the first simulation, the amount of CNTs isolated by the first packaging train 1202 may be about 162.7 tons/day (148,000 kg/day), while the amount removed to the second packaging train 1302 may be about 57.5 tons/day (52,000 kg/day).

The isolation system described above is merely exemplary. Any number of other systems may be used in embodiments. However, the CNTs have a very low density, of less than about 0.5 g/cc, depending on morphological distribution, and may best be packaged in a system configured to isolate them from the atmosphere to lower the amount lost to the plant environment. Further, the purge gas may be isolated from the feed gases, as shown for the systems in FIGS. 5 and 6, or may be separately provided, for example, for the systems in FIGS. 7 and 8.

Method

Figure 14:
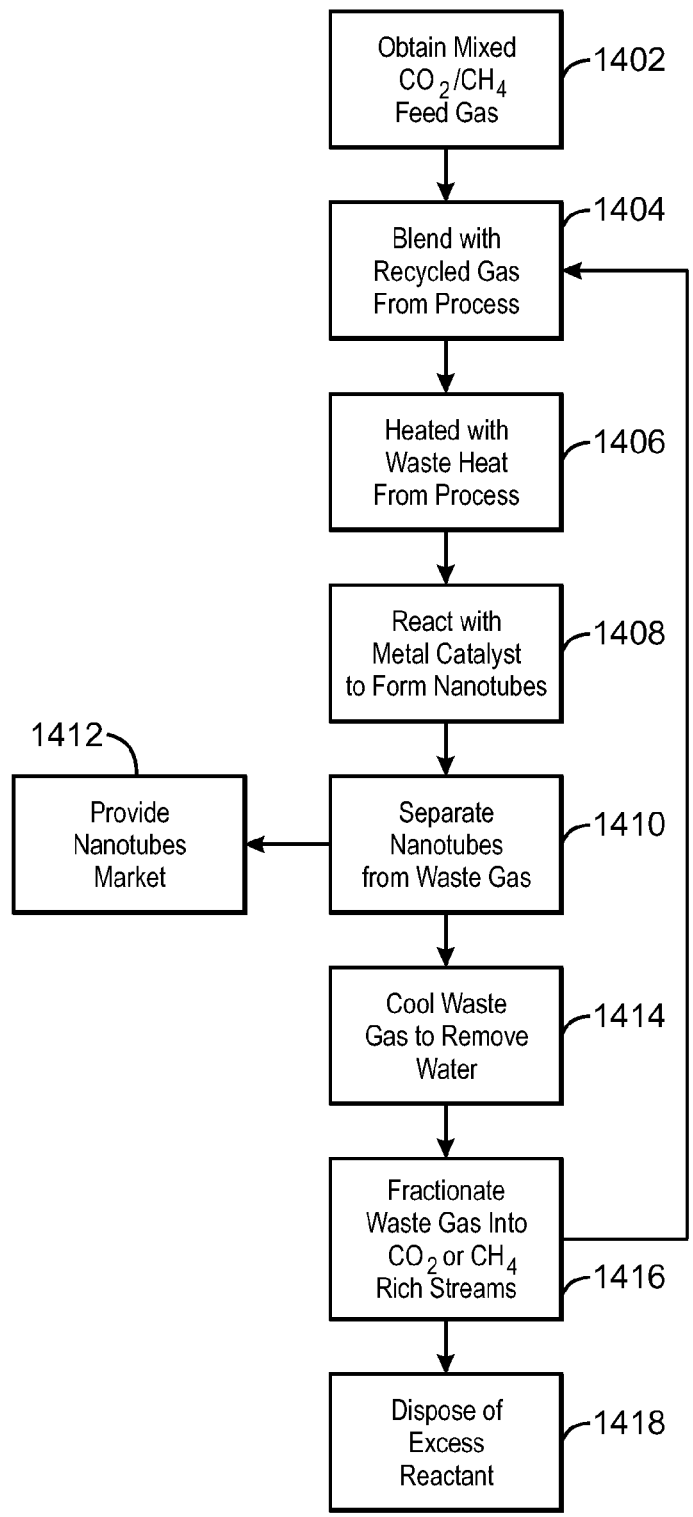
FIG. 14 is a method for generating carbon nanotubes from a feed gas that includes methane and carbon dioxide.

FIG. 14 is a method 1400 for generating carbon nanotubes from a feed gas that includes methane and carbon dioxide. The method 1400 begins at block 1402, at which a mixed $CO_2/CH_4$ feedstock is obtained. The feed stock may be obtained from any number of sources. As mentioned, the feedstock may include a natural gas harvested from a sub-surface reservoir, an exhaust gas from a power generation plant, or any number of other gases from natural or plant sources. Further, other feedstocks may be used in embodiments, including other materials, such as syngas, CO, $H_2$, other hydrocarbons, and the like.

At block 1404, the feedstock is combined with a recycle gas obtained from the wastes gases generated in the process. As described herein, the recycle gas may be obtained from the waste gases by cryogenic gas fractionation, as well as any number of other techniques. At block 1406, the combined gas stream is heated with waste heat recovered from the reaction process. After heating, at block 1408, the combined gas stream is reacted with a metal catalyst in a reactor to form the CNTs. At block 1410, the CNTs are separated from the waste gas. At block 1412, the separated CNTs are purged, cooled, and packaged to be sent to market.

The waste gas is cooled to remove excess water formed during the reaction. As the process is conducted at high temperatures and pressures, an ambient temperature heat exchanger provides sufficient cooling to condense out the water vapor. The processes described at blocks 1406-1414 will be repeated for each sequential reactor in the reaction system.

At block 1416, the waste gas is fractionated into a $CO_2$ enriched stream and a $CH_4$ enriched stream. At block 1418, whichever stream contains the excess reagent can be sold, while the other stream can be recycled to block 1404 to be used in the process.

Still other embodiments of the claimed subject matter may include any combinations of the elements listed in the following numbered paragraphs:

1. A system for the production of carbon nanotubes, comprising:
   a feed gas heater configured to heat a feed gas with waste heat from a waste gas stream;
   a reactor configured to form carbon nanotubes from the feed gas in a Bosch reaction;
   a separator configured to separate the carbon nanotubes from a reactor effluent stream forming the waste gas stream; and
   a water removal system, comprising an ambient temperature heat exchanger and a separator configured to separate a bulk of water from the waste gas stream to form a dry waste gas stream.
2. The system of paragraph 1, wherein the ambient temperature heat exchanger comprises a water chiller.
3. The system of paragraphs 1 or 2, wherein the ambient temperature heat exchanger comprises an air cooled heat exchanger.
4. The system of paragraphs 1, 2 or 3, comprising a package heater configured to heat the feed gas for an initial startup of the system.
5. The system of any of the preceding paragraphs, comprising:
   a compressor configured to increase the pressure of the dry waste gas stream; and
   a final water removal system configured to remove water from the dry waste gas stream.
6. The system of paragraph 5, comprising a gas fractionation system configured to separate a methane rich stream and a $CO_2$ rich stream from the dry waste gas stream.
7. The system of paragraph 6, comprising a mixing system configured to mix the methane rich stream into the feed gas before the feed gas heater.
8. The system of any of paragraphs 1-5, wherein the reactor is a fluidized bed reactor using a counter-current flow of feed gas to fluidize a catalyst.
9. The system of paragraph 8, wherein the catalyst comprises metal shot-blasting beads.
10. The system of any of paragraphs 1-5, or 8, comprising:
    a heat exchanger configured to heat the dry waste gas stream with waste heat from the waste gas stream to form a second feed gas;
    a second reactor configured to form carbon nanotubes from the second feed gas;
    a separator configured to separate the carbon nanotubes from an effluent stream from the second reactor forming a second waste gas stream, and wherein the waste gas stream used in the feed gas heater comprises the second waste gas stream; and
    a water removal system configured to separate water from the second waste gas stream using an ambient temperature heat exchanger to chill the second waste gas stream and remove the bulk of the water to form a second dry waste gas stream.
11. The system of paragraph 10, comprising:
    a compressor configured to increase a pressure of the second dry waste gas stream; and
    a final water removal system configured to remove water from the second waste gas stream.
12. The system of paragraph 11, comprising a gas fractionation system configured to separate a methane rich stream and a $CO_2$ rich stream from the second waste gas stream.
13. The system of paragraph 12, comprising a mixing system configured to mix the methane rich stream into the feed gas before the feed gas heater.
14. The system of any of paragraphs 1-5, 8, or 10, wherein the reactor is a fluidized bed reactor using a counter-current flow of feed gas to fluidize a catalyst.
15. The system of paragraph 14, wherein the catalyst comprises metal shot-blasting beads.
16. The system of paragraph 14, wherein the catalyst comprises metal beads comprising iron and nickel, chromium, or any combinations thereof.
17. The system of paragraph 14, wherein the catalyst comprises metal beads between about 25 mesh and 50 mesh in size.
18. The system of any of paragraphs 1-5, 8, 10, or 14, wherein the reactor is lined with a material configured to prevent degradation of a metal shell.
19. The system of any of paragraphs 1-5, 8, 10, 14, or 18, wherein a piping connection between the reactor and a cross heat exchanger is lined with a refractory material configured to protect a metal surface from degradation.

20. The system of any of paragraphs 1-5, 8, 10, 14, 18, or 19, wherein the feed gas heater comprises a heat exchanger configured for use in a metal dusting environment.

21. A method for forming carbon nanotubes, comprising:
forming carbon nanotubes in a reactor using a Bosch reaction;
separating the carbon nanotubes from a reactor effluent to form a waste gas stream;
heating the feed gas, a dry waste gas stream, or both, with waste heat from the waste gas stream; and
chilling the waste gas stream in an ambient temperature heat exchanger to condense water vapor, forming the dry waste gas stream.

22. The method of paragraph 21, comprising:
compressing the dry waste gas stream to form a compressed gas;
passing the compressed gas through an ambient temperature heat exchanger to condense and remove any remaining water vapor;
fractionating the compressed gas to separate methane and carbon dioxide; and
adding the methane to the feed gas.

23. The method of paragraphs 21 or 22, comprising:
feeding the dry waste gas stream to a second reactor;
forming another portion of carbon nanotubes in the second reactor;
separating the carbon nanotubes to form a second waste gas stream;
heating the feed with waste heat from the second waste gas stream; and
chilling the second waste gas stream in an ambient temperature heat exchanger to condense water vapor, forming a second dry waste gas stream.

24. The method of any of paragraphs 21-23, comprising:
compressing the second dry waste gas stream to form a compressed gas;
passing the compressed gas through an ambient temperature heat exchanger to condense and remove any remaining water vapor;
fractionating the compressed gas to separate methane and carbon dioxide; and
adding the methane to the feed gas.

25. A reaction system for forming carbon nanotubes, comprising:
two or more reactors configured to form carbon nanotubes from gas streams using a Bosch reaction, wherein an effluent from each reactor, before a final reactor, is used as a feed stream for a downstream reactor, and wherein an effluent stream from the final reactor comprises a reactant depleted waste stream;
a separation system downstream of each reactor, wherein the separation system is configured to remove carbon nanotubes from the effluent from the reactor;
a feed heater downstream of each separation system, wherein the feed heater comprises a heat exchanger configured to heat a feed gas stream for a following reactor using waste heat from the effluent from the reactor, and wherein the feed heater downstream of the final reactor is configured to heat a gas stream for the first reactor;
an ambient temperature heat exchanger downstream of each feed heater, wherein the ambient temperature heat exchanger is configured to remove water from the effluent, forming the feed stream for the following reactor;
a compressor configured to increase the pressure of the reactant depleted waste stream;
an ambient temperature heat exchanger downstream of the compressor, configured to remove water from the reactant depleted waste stream;
a gas fractionation system configured to separate the reactant depleted waste stream into a methane enriched stream and a carbon dioxide enriched stream; and
a mixer configured to blend the methane enriched stream or the carbon dioxide enriched stream into an initial feed stream.

26. The reaction system of paragraph 25, wherein a reactor comprises a fluidized bed reactor using metal beads as a catalyst.

27. The reaction system of paragraphs 25 or 26, comprising a separation vessel downstream of each of the ambient temperature heat exchangers, wherein the separation vessel is configured to separate liquid water from a gas stream.

28. The reaction system of any of paragraphs 25-27, comprising a plurality of package heaters configured to heat the feed stream to the each of the two or more reactors.

29. The reaction system of any of paragraphs 25-28, comprising a package heater configured to heat an initial feed stream for plant startup.

30. The reaction system of paragraph 29, wherein the package heater is used to heat a feed stream to a subsequent reactor.

31. The reaction system of paragraph 29, wherein the package heater is a heater configured to be field erected, or an electric power heater, a commercial heater configured for heating gases, or any combinations thereof.

32. The reaction system of paragraph 29, wherein the package heater is configured to heat a reducing gas stream without substantial damage.

While the present techniques may be susceptible to various modifications and alternative forms, the embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A system for the production of carbon nanotubes, comprising:
a feed gas heater comprising a heat exchanger configured to heat a feed gas with waste heat from a waste gas stream;
a reactor configured to receive the feed gas from the feed gas heater and to form carbon nanotubes from the feed gas on catalyst in a Bosch reaction, and to discharge a reactor effluent stream, wherein the reactor is a fluidized bed reactor;
a separator configured to separate the carbon nanotubes from the reactor effluent stream, forming the waste gas stream; and
a water removal system comprising an ambient temperature heat exchanger and a separation vessel, the water removal system configured to separate a bulk of water from the waste gas stream to form a dry waste gas stream.

2. The system of claim 1, wherein the ambient temperature heat exchanger comprises a water chiller.

3. The system of claim 1, wherein the ambient temperature heat exchanger comprises an air cooled heat exchanger.

4. The system of claim 1, comprising a package heater configured to heat the feed gas during startup of the system.

5. The system of claim 1, comprising:
a compressor configured to increase the pressure of the dry waste gas stream; and
a final water removal system configured to remove water from the dry waste gas stream.

6. A system for the production of carbon nanotubes, comprising:
a feed gas heater comprising a heat exchanger configured to heat a feed gas with waste heat from a waste gas stream;
a reactor configured to receive the feed gas from the feed gas heater and to form carbon nanotubes from the feed gas on catalyst in a Bosch reaction, and to discharge a reactor effluent stream;
a separator configured to separate the carbon nanotubes from the reactor effluent stream, forming the waste gas stream;
a water removal system comprising an ambient temperature heat exchanger and a separation vessel, the water removal system configured to separate a bulk of water from the waste gas stream to form a dry waste gas stream;
a compressor configured to increase the pressure of the dry waste gas stream;
a final water removal system configured to remove water from the dry waste gas stream; and
a gas fractionation system configured to separate a methane rich stream and a $CO_2$ rich stream from the dry waste gas stream.

7. The system of claim 6, comprising a mixing system configured to mix the methane rich stream into the feed gas before the feed gas heater.

8. The system of claim 7, wherein the catalyst comprises metal shot-blasting beads, and wherein the mixing system comprises a static mixer.

9. The system of claim 1, wherein the catalyst comprises metal beads comprising iron and nickel, or chromium, or any combinations thereof.

10. The system of claim 1, wherein the catalyst comprises metal beads between about 25 mesh and 50 mesh in size.

11. The system of claim 1, wherein the reactor is lined with a material configured to prevent degradation of a metal shell of the reactor, and wherein the heat exchanger comprises a shell-and-tube heat exchanger.

12. The system of claim 1, wherein a piping connection between the reactor and a cross heat exchanger is lined with a refractory material configured to protect a metal surface from degradation.

13. A reaction system for forming carbon nanotubes, comprising:
two or more reactors each configured to form carbon nanotubes from feed gas on a catalyst in a Bosch reaction, wherein effluent from each reactor, before a final reactor of the two or more reactors, is feed gas for a downstream reactor, and wherein effluent from the final reactor comprises a reactant depleted waste stream;
a respective separation system associated with and downstream of each reactor of the two or more reactors, wherein each separation system is configured to remove carbon nanotubes from the effluent from the associated reactor;
a respective feed heater downstream of each separation system, wherein each feed heater comprises a heat exchanger configured to heat feed gas for a following reactor with waste heat from the effluent, and wherein the feed heater downstream of the final reactor is configured to heat feed gas for a first reactor of the two or more reactors;
a respective ambient temperature heat exchanger downstream of each feed heater, wherein each ambient temperature heat exchanger is configured to remove water from the effluent;
a compressor configured to increase the pressure of the reactant depleted waste stream;
another ambient temperature heat exchanger downstream of the compressor, configured to remove water from the reactant depleted waste stream;
a gas fractionation system configured to separate the reactant depleted waste stream into a methane enriched stream and a carbon dioxide enriched stream; and
a mixer configured to blend the methane enriched stream or the carbon dioxide enriched stream into an initial feed stream to give the feed gas for the first reactor.

14. The reaction system of claim 13, wherein the two or more reactors each comprise a fluidized bed reactor, and wherein the catalyst comprises metal beads.

15. The reaction system of claim 13, comprising a respective separation vessel downstream of each ambient temperature heat exchanger, wherein each separation vessel is configured to separate liquid water from gas.

16. The reaction system of claim 13, comprising package heaters configured to heat the feed gas to each of the two or more reactors, respectively, during startup of the reaction system.

17. The reaction system of claim 16, wherein the package heaters are a heater configured to be field erected, or is an electric power heater, or a combination thereof.

18. The reaction system of claim 13, wherein the mixer comprises a static mixer.

19. A system for the production of carbon nanotubes, comprising:
a heat exchanger to cross-exchange a feed gas with a waste gas stream to heat the feed gas, wherein the heat exchanger comprises a shell-and-tube heat exchanger;
a reactor to receive the feed gas from the heat exchanger and to form carbon nanotubes from the feed gas in a Bosch reaction;
a separator to separate the carbon nanotubes from an effluent stream of the reactor, forming the waste gas stream; and
a water removal system comprising an ambient temperature heat exchanger and a separation vessel, the water removal system to separate a bulk of water from the waste gas stream to form a dry waste gas stream.

20. A system for the production of carbon nanotubes, comprising:
a heat exchanger to cross-exchange a feed gas with a waste gas stream to heat the feed gas;
a reactor to receive the feed gas from the heat exchanger and to form carbon nanotubes from the feed gas in a Bosch reaction;
a separator to separate the carbon nanotubes from an effluent stream of the reactor, forming the waste gas stream;
a water removal system comprising an ambient temperature heat exchanger and a separation vessel, the water removal system to separate a bulk of water from the waste gas stream to form a dry waste gas stream;
a compressor to increase pressure of the dry waste gas stream; and
a final water removal system to remove water from the dry waste gas stream downstream of the compressor.

21. The system of claim 20, comprising a gas fractionation system to process the dry waste gas stream downstream of the final water removal system to discharge a methane rich stream and a carbon dioxide rich stream.

22. The system of claim 21, comprising a mixer to mix the methane rich stream into the feed gas upstream of the feed gas heater.

23. The system of claim 22, wherein the mixer comprises a static mixer.

24. A system for the production of carbon nanotubes, comprising:
- a first heat exchanger to heat a second feed gas with waste heat from a first waste gas stream;
- a second heat exchanger to heat a first feed gas with waste heat from a second waste gas stream;
- a first reactor to receive the first feed gas from the second heat exchanger and to react the first feed gas on a first catalyst to form carbon nanotubes;
- a first separator to separate carbon nanotubes from effluent of the first reactor, forming the first waste gas stream;
- a second reactor to receive react the second feed gas from the first heat exchanger and to react the second feed gas on a second catalyst to form carbon nanotubes; and
- a second separator to separate carbon nanotubes from effluent of the second reactor, forming the second waste gas stream.

25. The system of claim 24, comprising:
- a first water removal system comprising a first ambient temperature heat exchanger and a first separation vessel, the first water removal system to receive the first waste gas stream from the first heat exchanger and to remove water from the first waste gas stream, forming a first dry waste gas stream, wherein the first dry waste gas stream comprises the second feed gas stream; and
- a second water removal system comprising a second ambient temperature heat exchanger and a second separation vessel, the second water removal system to receive the second waste gas stream from the second heat exchanger and to remove water from the second waste gas stream, forming a second dry waste gas stream.

26. The system of claim 25, comprising:
- a compressor to increase pressure of the second dry waste gas stream; and
- a final water removal system comprising a third ambient temperature heat exchanger and a third separation vessel, the final water system to receive the second dry waste gas stream from the compressor and to remove water from the second dry waste gas stream.

27. The system of claim 26, comprising:
- a gas fractionation system to receive the second dry waste gas stream from the final water removal system and to separate the second dry waste gas stream into a methane rich stream and a $CO_2$ rich stream; and
- a mixer to mix the methane rich stream into the first feed gas before the first feed gas heater, wherein the first catalyst and the second catalyst each comprise metal beads.

* * * * *